US008712144B2

(12) United States Patent  
Mas et al.

(10) Patent No.: US 8,712,144 B2
(45) Date of Patent: *Apr. 29, 2014

(54) SYSTEM AND METHOD FOR DETECTING CROP ROWS IN AN AGRICULTURAL FIELD

(75) Inventors: Francisco Rovira Mas, Urbana, IL (US); Qin Zhang, Champaign, IL (US); John Franklin Reid, Champaign, IL (US)

(73) Assignees: Deere & Company, Moline, IL (US); University of Illinois Grant and Contrect Administration, Champaign, IL (US)

( * ) Notice: Subject to any disclaimer, the term of this patent is extended or adjusted under 35 U.S.C. 154(b) by 3088 days.

This patent is subject to a terminal disclaimer.

(21) Appl. No.: 10/817,900

(22) Filed: Apr. 6, 2004

(65) Prior Publication Data  
US 2004/0264761 A1 Dec. 30, 2004

Related U.S. Application Data

(60) Provisional application No. 60/467,121, filed on Apr. 30, 2003.

(51) Int. Cl.  
*G06K 9/00* (2006.01)  
*G06T 15/00* (2011.01)
(52) U.S. Cl.  
USPC ............ 382/154; 382/106; 382/108; 345/419
(58) Field of Classification Search  
USPC ................. 382/100, 103–107, 110, 115, 154; 348/143–161; 700/1; 703/1, 6, 8; 701/36; 345/419–427; 356/12–22, 356/419–427  
See application file for complete search history.

(56) References Cited

U.S. PATENT DOCUMENTS 4,883,964 A 11/1989 Bohman  
5,442,552 A 8/1995 Slaughter et al.  
(Continued)

FOREIGN PATENT DOCUMENTS

WO WO 96/17279 6/1996

OTHER PUBLICATIONS

Ta-Te Lin, Wei-Jung chen. Fu-Ming Lu, "Integration of Spatial Mapping System Using GPS and Stereo Machine Vision" written and presented at the 2002 ASAE Annual International Meeting/VIGR XVth World Congress Sponsored by ASAE and CIGR, Chicago, Illinoise, USA, Jul. 28-Jul. 31, 2002. Paper No. 021195 meeting presentation and slides.*

(Continued)

*Primary Examiner* — Hadi Akhavannik  
*Assistant Examiner* — Mehdi Rashidian  
(74) *Attorney, Agent, or Firm* — AlbertDhand LLP

(57) ABSTRACT

A system and method for creating 3-dimensional agricultural field scene maps are disclosed comprising producing a pair of images using a stereo camera and creating a disparity images based on the pair of images, the disparity image being a 3-dimensional representation of the stereo images. Coordinate arrays can be produced from the disparity image and the coordinate arrays can be used to render a 3-dimensional local map of the agricultural field scene. Global maps can also be made by using geographic location information associated with various local maps to fuse together multiple local maps into a 3-dimensional global representation of the field scene.

28 Claims, 31 Drawing Sheets  
(10 of 31 Drawing Sheet(s) Filed in Color)

(56) References Cited

U.S. PATENT DOCUMENTS

| | | | |
|---|---|---|---|
| 5,555,018 A * | 9/1996 | von Braun | 348/144 |
| 5,715,665 A | 2/1998 | Diekhans et al. | |
| 5,715,666 A | 2/1998 | Huster et al. | |
| 5,828,971 A | 10/1998 | Diekhans et al. | |
| 5,857,539 A | 1/1999 | Diekhans et al. | |
| 5,917,937 A * | 6/1999 | Szeliski et al. | 382/154 |
| 6,101,795 A | 8/2000 | Diekhans | |
| 6,278,918 B1 | 8/2001 | Dickson et al. | |
| 6,385,515 B1 | 5/2002 | Dickson et al. | |
| 6,445,983 B1 * | 9/2002 | Dickson et al. | 701/23 |
| 6,490,539 B1 | 12/2002 | Dickson et al. | |
| 7,587,081 B2 * | 9/2009 | Rovira-Mas et al. | 382/154 |
| 2001/0016053 A1 | 8/2001 | Dickson et al. | |

OTHER PUBLICATIONS

Agricultural Primer Series, Manual, Copyright 1997, pp. 26-28, Deere & Company, John Deere Publishing, Department. 374, Moline, Illinois.

* cited by examiner

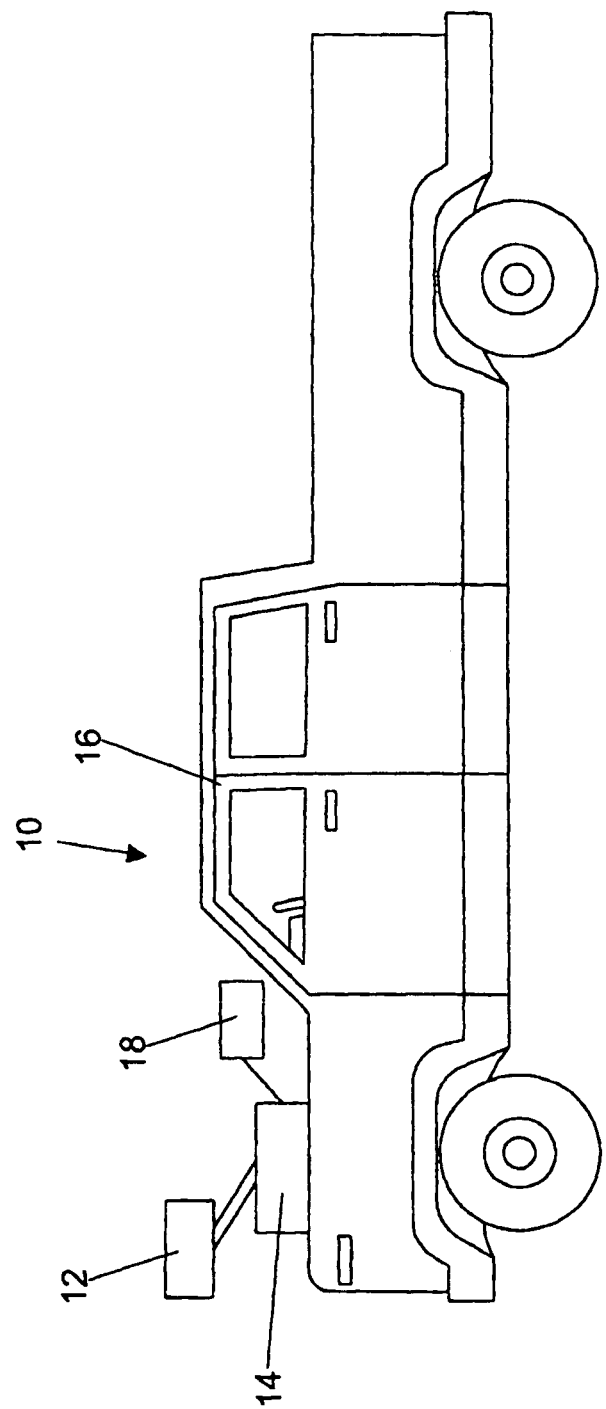

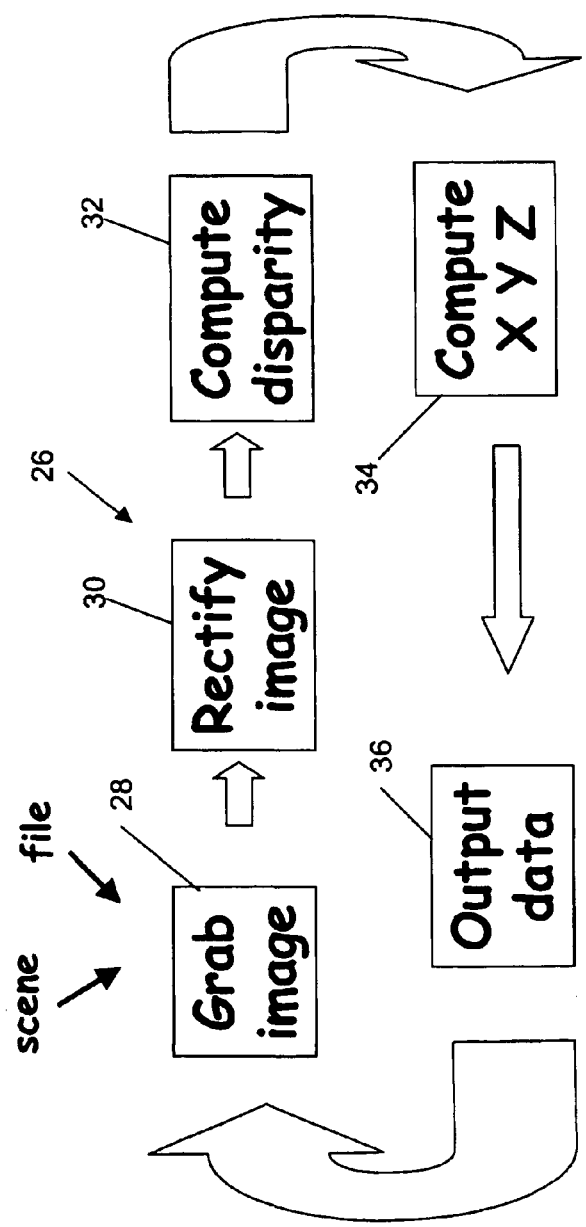
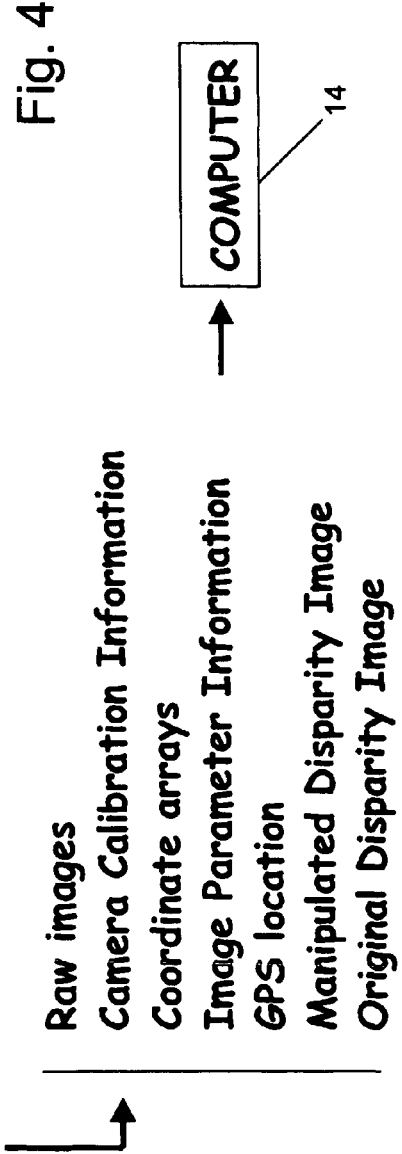
Fig. 4

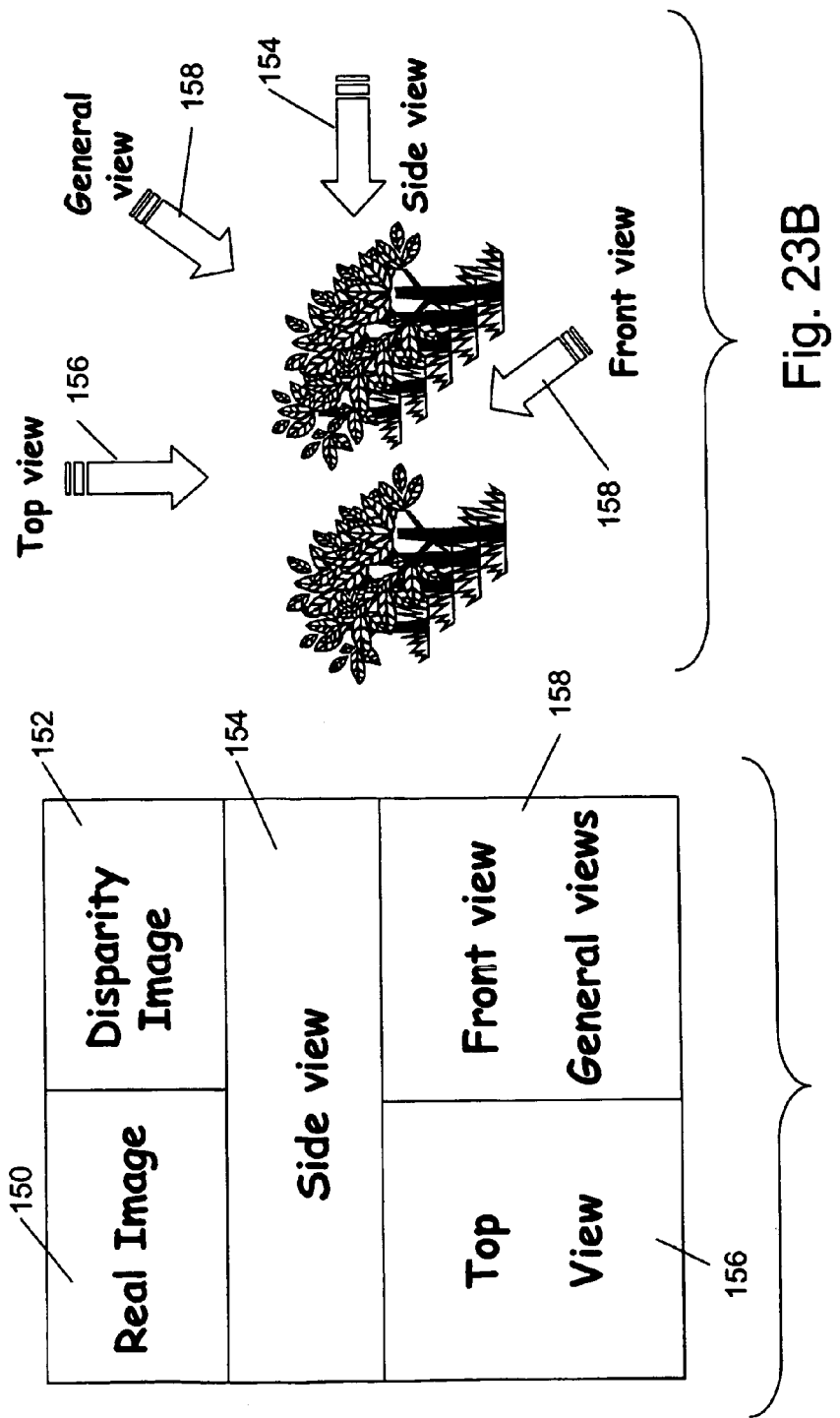

SYSTEM AND METHOD FOR DETECTING CROP ROWS IN AN AGRICULTURAL FIELD

The present application claims priority to U.S. provisional patent application No. 60/467,121, filed Apr. 30, 2003 and incorporated herein by reference.

FIELD OF THE INVENTION

The present invention relates generally to the field of agricultural mapping systems. More particularly, the present invention relates to systems and methods for detecting crop rows in an agricultural field scene.

BACKGROUND INFORMATION

Remote sensing techniques have been used to generate geographical and spatial information related to an agricultural field. These techniques can be used for monitoring field and/or crop conditions. However, these techniques are of limited use as they only provide two-dimensional images of the field.

Two dimensional field information has also been used for guiding vehicles through a field. In these types of systems, standard cameras, such as CCD devices or video cameras, have been used for detecting the trajectory of an automated vehicle in an agricultural field. However, since no depth information can be efficiently obtained from conventional images, the robustness of such systems rely heavily on the accuracy of the camera calibration, typically performed by means of least mean square methods. As such, conventional machine vision-based vehicle guidance systems have been expensive and unreliable.

One method employed in automatic vehicle guidance systems is to guide farm cultivation equipment through a field based on perceived crop rows. However, conventional crop row detection techniques require significant processing capabilities. For example, the techniques generally require extensive pre-processing algorithms such as binarization processes and threshold calculations in order to accurately identify crop rows from images taken of in an agricultural field scene. In addition, the principal pattern recognition methods used with conventional crop row detection techniques are highly sensitive to noise picked in the field scene images.

Thus, there is a need for an accurate and reliable crop row detection system and method which is easy to operate and inexpensive to maintain.

SUMMARY OF THE INVENTION

These and other needs are satisfied by a system and method for detecting crop rows in an agricultural field scene according to the present invention. For example, a system and method according to the present invention can be configured to provide third coordinate (depth) data by using a stereo camera for capturing images. The individual shots imply a pair of images that, through disparity analysis, permits the computation of depth. A disparity image, providing a 3-dimensional representation of an agricultural field scene, can be made from the stereo images. The disparity image can be used to detect crop rows in an efficient and accurate manner. One advantage of a system and method according to the present invention is that much of the pre-processing algorithms of conventional crop row detection systems and methods are unnecessary. Disparity images can also be used to generate 3-dimensional maps of the agricultural field scene.

Local detail can be assured by a system and method according to the present invention since multiple images can be taken with the camera moving through the whole area to be mapped recording the information of each individual image. These individual images can provide information within a close range in front of the camera. Global information can also be achieved by fusing the local images grabbed by the camera in a complete global map by means of geographic location information, such as the GPS coordinates of the camera.

A system for creating disparity images according to the present invention can comprise a stereo camera (such as a charge-coupled device) used to generate a 3-dimensional image of a landscape (for example, plant life in an agricultural work area, such as a field or orchard).

The vehicle-mounted stereo camera system collects local images, defined consistent with Cartesian coordinates or polar coordinates. In one embodiment, the local images (at optical or infra-red frequencies, for example) provided by the vehicle-mounted camera can range in radial distance from approximately 1 meter to 25 meters from the vehicle. The local images can be associated with respective geographic coordinates provided by a location-determining receiver (such as a Global Positioning System receiver) on the vehicle. A synthesizer can accept the local images and associated geographic coordinates as input data. The synthesizer can then fuse two or more local images by aligning the geographic coordinates associated with corresponding local images.

Three-dimensional agricultural field scene maps according to the present invention can be utilized to track the state of development of vegetation, as well as sensing physical parameters important for production such as crop row spacing, tree height, or crop volume. This crop growth information can be an important factor for making fertilizer application decisions as well as for investigating spatial variation in overall yield. Canopy architecture and structure, as for instance the volume of trees, can also be significant for production in agriculture. A system and method according to the present invention can be used to provide repeated, non-destructive, non-contact crop growth measurements.

The maps also can be used for automatic vehicle guidance. For example, the stereo image may provide a planar slice, in a generally horizontal plane parallel to the ground, called a guiding image. The guiding image may be processed via Hough transform or another technique (such as pattern recognition) for tracking an agricultural machine along crop rows in a generally linear manner or otherwise.

Other principle features and advantages of the invention will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1a is a block diagram of one embodiment of a system according to the present invention;

FIG. 4 is a block diagram of one embodiment of an algorithm for capturing and processing stereo images according to the present invention;

FIG. 21b is one embodiment of a sample disparity image corresponding to the image pair of the left image shown in FIG. 21a;

FIG. 22a is one embodiment of a sample left image of a stereo pair taken from an aircraft according to the present invention;

FIG. 22b is one embodiment of a sample disparity image corresponding to the image pair of the left image shown in FIG. 22a;

FIG. 22C is one embodiment a sample conventional image corresponding to FIGS. 22a and b.

FIGS. 23a and 23b are a diagrammatical representation of the images shown in FIGS. 24-29;

DETAILED DESCRIPTION OF THE PREFERRED EMBODIMENTS

Figure 2A:
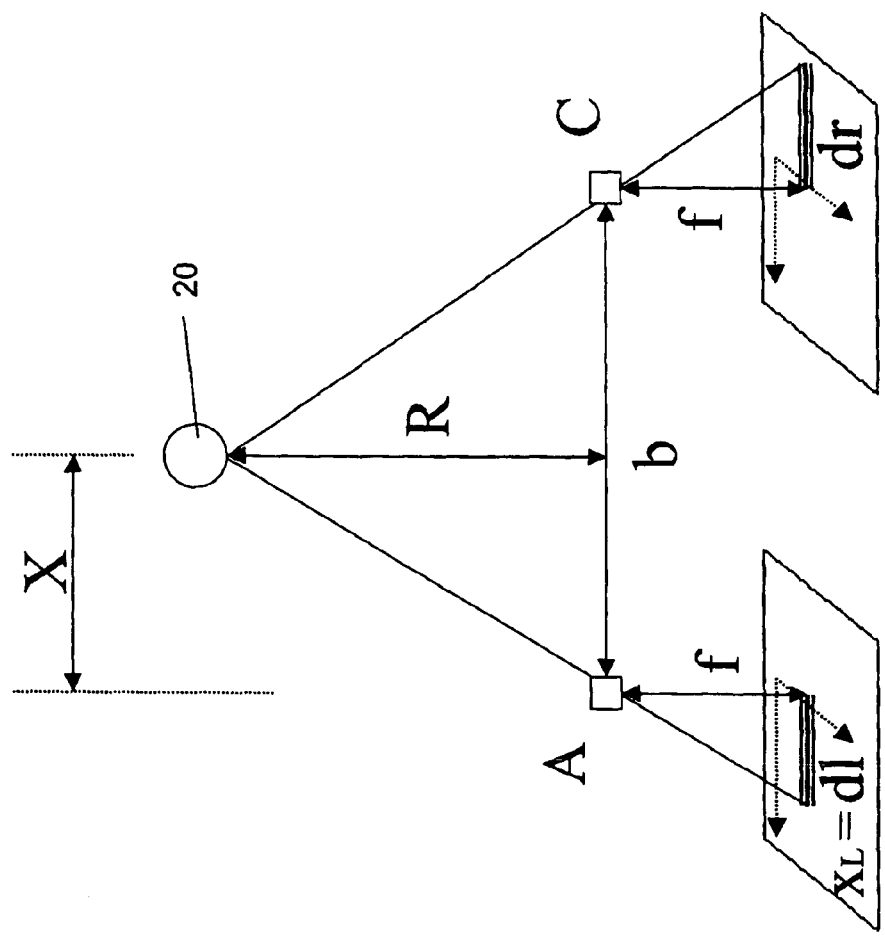
FIG. 2a is a diagrammatical representation of one embodiment of an object being captured by two simultaneous images.

In accordance with the present invention, systems and methods for detecting crop rows in an agricultural field scene are described that provide distinct advantages when compared to those of the prior art. The first step in detecting crop rows according to the present invention involves creating a 3-dimensional map of the agricultural field scene of interest. A system and method according to the present invention processes and analyzes the 3-dimensional map in order to detect crop rows present in the agricultural field scene. The invention can best be understood with reference to the accompanying drawing figures.

Referring now to the drawings, FIG. 1 shows a block diagram of a system 10 for creating 3-dimensional crop maps according to the present invention. The system 10 comprises a compact stereo camera 12 and a processing computer 14 mounted on a vehicle 16.

The camera 12, which is electrically connected to the computer 14, is configured to generate stereo images, i.e. two overlapping images taken simultaneously, of the area to be mapped as the vehicle 16 is driven through the area. In one embodiment, the camera 12 comprises a single unit having two lenses for sensing a right and left image. In another embodiment, the camera 12 comprises two cameras positioned to obtain overlapping images.

The vehicle 16 can be any type of vehicle capable of surveying the area. For example, the vehicle 16 could be an all terrain vehicle, a tractor or other farm vehicle, a helicopter, an automobile, a motorcycle, etc. In one embodiment, the stereo camera 12 is connected to the computer via a high speed serial connection such as an IEEE 1394 6-pin cable and a 1394 PCMCIA Host Interface Card. The camera 12 can include various filters, such as an infrared filter, or lens selections. The camera 12 can be pre-calibrated.

In a system according to one embodiment of the present invention, the computer 14 can save the stereo images and generate realtime disparity images from the stereo images captured by the camera 12. The computer 14 can also store image parameters, such as camera focal length and camera center set during the camera calibration, and generate coordinate arrays from the disparity images and image parameters.

The system 10 can also include a location tracking device 18. The location tracking device 18 is configured for providing geographic location information of the camera 12 so that the coordinate array information can be mapped to specific geographic locations. One example of a location tracking device 18 is a GPS system. In addition, inertial sensors (not shown) can be included if the vehicle 18 is an aircraft, such as a helicopter. The computer 14 can be configured for storing the geographic location information corresponding to the stereo images.

One advantage of a system 10 according to the present invention is that the calibration process of a stereo camera 12 is typically easier than that of conventional monocular cameras and the results are more reliable with the addition of the extra data provided by depth information. This invention unites the advantages of local and global information in the same entity. It can provide the level of detail typical of conventional monocular video cameras and, in addition, can supply the big picture of a field, which allows for a wide range of land management decisions. In addition, it provides the benefit of having access to a truthful 3-dimensional representation of a scene where the best point of view can be chosen based upon the application being considered. The system 10 can be used in a wide variety of applications, such as automatic guidance of vehicles, crop yield estimation, crop growth monitoring, precision field spraying, etc. For example, the computer 14 can be configured for executing an automatic guidance algorithm based on the image data collected and processed by the system 10.

Off-line processing of the image data can also be utilized, if desired, for rendering 3-dimensional images with a large number of points. For example, off-line processing can perform various transformations using data point coordinates and position information. Sample transformation can include from camera coordinates to conventional coordinates, or from latitude-longitude to east-north. Noise reduction can also be incorporated within the transformation algorithms. In addition, the individual (local) images can be merged into a global map. To do so, local coordinates can be transformed into global coordinates (east-north) using the geographic location information collected by the location tracking device 18. Once the coordinates refer to the same frame and origin, the map is ready for a 3-dimensional display.

Generally speaking, two different domains can be defined in the process of mapping objects with a camera to extract useful information. In the image domain, every pixel in an image is referred to by its two coordinates (x, y). These coordinates are bound by the image resolution, for example 320×240 means that 0<x<320 and 0<y<240. In the real world, every physical point before the camera is determined by the real world Cartesian coordinates (X,Y,Z), whose units are usually given in feet or meters. The center, system, and units of coordinates are defined according to each particular application.

The process of creating a 3-D map involves utilizing information from the stereo images generated by the stereo camera 12 to create a three-dimensional representation of an agricultural field scene. Mapping a three-dimensional scene onto an image plane is a many-to-one transformation in which an image point does not uniquely determine the location of a corresponding world point, because depth information is missing. When a picture is taken with a camera, the depth information is lost because an image pixel (x,y) is not uniquely related to a world location (X,Y,Z). However, if two images are taken simultaneously and then compared, the third dimension, depth, can be found by means of geometry.

Range information (i.e. depth) can be computed by using triangulation between the two overlapping (left and right) images obtained from the stereo camera 12. The images can be obtained from cameras having the same focal length with the xy plane of every image aligned with the XY plane of the real world, that is, the Z coordinate (depth or range) of a sensed point is the same for both images.

Beginning with a discussion of the geometry of stereovision in general, FIG. 2a depicts a situation in which an object 20 is captured by two simultaneous images, such as in both the left and right images of the stereo camera 12. The distance between the center points of the two images is defined as the baseline of the stereo camera 12 and is represented by b. The focal length is f, and R represents the range or distance to the sensed object 20.

Figure 2B:
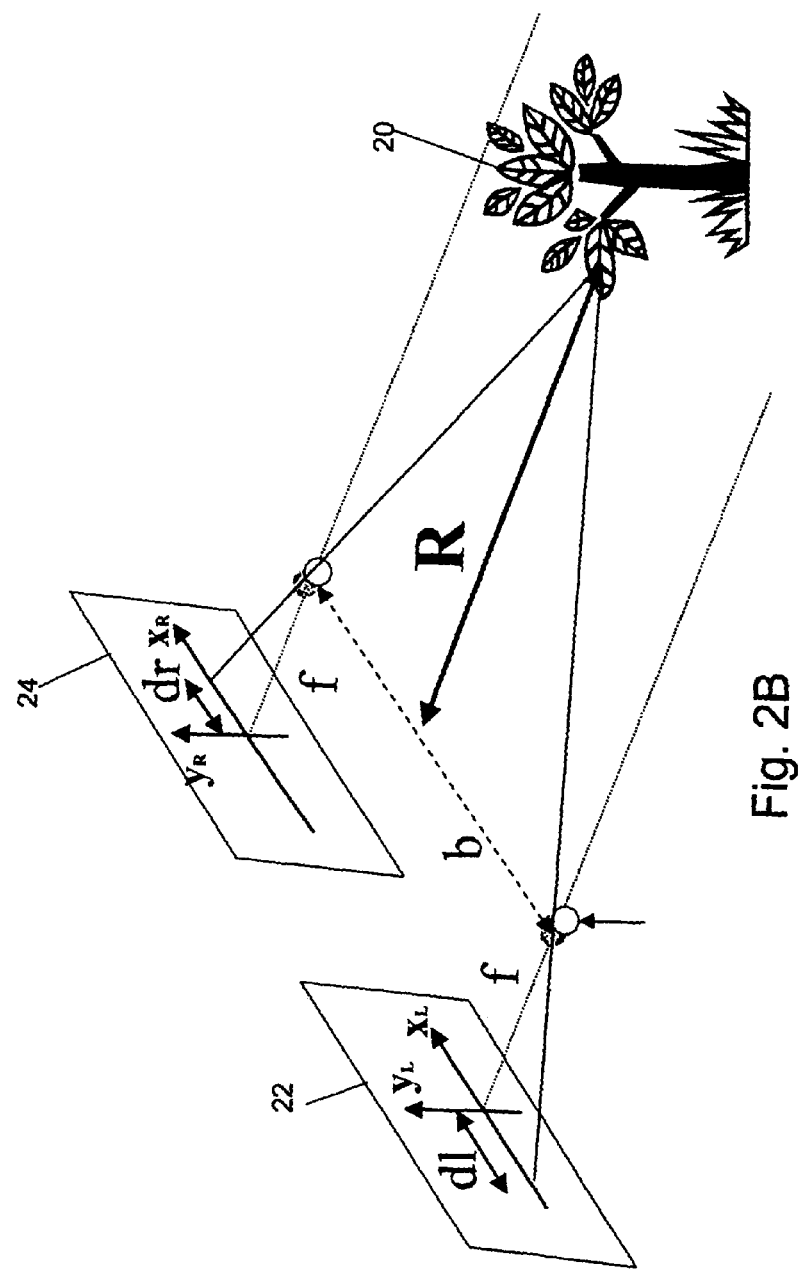
FIG. 2b is a diagrammatical representation of another embodiment of an object being captured by two simultaneous images.

The first step in determining the real world Cartesian coordinates of any point in a scene, based on left and right image coordinates ($x_L$, $y_L$ and $x_R$, $y_R$, respectively) involves determining the range R. FIG. 2b illustrates the geometry involved in using triangulation to find the depth in an image. In FIG. 2b, dl ($x_L$) gives the position in pixels (image domain) of the object 20 in the left image 22 and dr ($x_R$) gives the position, also in pixels, of the same point in the right image 24.

The basic result of a stereovision process is a disparity image. The disparity of a point in a given scene can be expressed as the difference (horizontal distance) in pixels between its location in the right and left images. A disparity image is an image that acknowledges differences between two stereo images and gives the distance from points in a scene to the camera's plane. One way of generating a disparity image can be to designate the left image 22 as a reference and plot every pixel with an intensity value proportional to its disparity based on a comparison with the corresponding pixel from the right image 24. A disparity image provides the missing depth dimension that cannot be obtained using a monocular system. Disparity, D, is defined as:

$$D = dl - dr$$

A three-dimensional representation of a scene can then be constructed by knowing the position of each point in the image and adding the third dimension, depth, facilitated by the disparity image.

Referring again to FIG. 2b, by similarity of triangles:

$$\left. \begin{array}{l} \dfrac{R}{AB} = \dfrac{f}{|dl|} \rightarrow AB = \dfrac{|dl|}{f} \cdot r \\ \dfrac{R}{BC} = \dfrac{f}{|dr|} \rightarrow BC = \dfrac{|dr|}{f} \cdot r \end{array} \right\}$$

Relating this to the baseline, b, it is determined that:

$$b = AB + BC = \dfrac{|dl|}{f} \cdot R + \dfrac{|dr|}{f} \cdot R = (|dl| + |dr|) \cdot \dfrac{R}{f} = (dl - dr) \cdot \dfrac{R}{f} = D \cdot \dfrac{R}{f}$$

These calculations give us the relationship between ranges and disparity. As shown below, range and disparity are inversely proportional:

$$R_{[mm]} = \frac{b_{[mm]} \cdot f_{[mm]}}{D_{[pixels]} \cdot w_{[mm/pixel]}}$$

Where w is a conversion factor between pixels and length.

Thus, when calculating the real world Cartesian coordinates of an object from stereo images, the "Z" coordinate is the depth or R from the equation listed above. The "X" and "Y" coordinates of the object can be calculated as follows:

$$X = \frac{x_L \cdot w \cdot R}{f}$$

$$Y = \frac{y_L \cdot w \cdot R}{f}$$

For every point identified in the stereo images, a disparity value, D, can be calculated as defined above.

Taking the left image 22 as a reference, every pixel can be represented by an intensity value proportional to its disparity. Because disparity and range are directly related, disparity maps provide range information, where objects closer to the camera can be mapped with lighter colors and objects farther from the camera can be mapped with darker colors. Disparity determination requires left-right matching, an operation that can be performed by the computer 14. Not every pixel can necessarily be paired: some areas of the left image 22 may not appear in the right image 24 and vise versa. Filters can be added to account for errors caused by difficulties in the matching process as well as potential errors caused by other effects such as lack of texture, improper illumination, improper camera focus or lens aperture, etc.

In one embodiment, the plane of the furthest match can be given by disparity zero and the highest value of disparity can represent the closest point to the camera 12. The volume represented between the furthest and closest disparity points is called horopter. Horopter can be increased in a variety of ways such as, reducing the stereo baseline, decreasing the camera focal length, scaling the image by augmenting the pixel size, working with a higher number of disparities, etc.

There are many different ways of expressing disparity images. For example, in one embodiment according to the present invention, the map can be in transformed pixels in false colors where disparity ranges from 0 to 240 (in other words 15*16, where 15 is the maximum disparity in a range 0-15, and 16 is the disparities per pixel). In this example, closer objects can be identified by lighter intensities of green.

Another example embodiment according to the present invention involves intensity values that are spanned (defined as normalized disparity) in such a way that they are comprised in the typical range of 0 to 255 and then inverted. In this embodiment closer objects are represented by darker pixels. The relationship between transformed and inverted disparity is:

$$i_g = \text{round}\left[D \cdot \frac{225}{D_M}\right] \quad i_{-1} = 255 - i_g$$

Where:
D Disparity value of transformed pixel
$D_M$ Maximum value of disparity set by user
$I_g$ Gray value of normalized disparity
$I_{-1}$ Inverted disparity It should be noted that other known methods of expressing disparity images can be used without departing from the spirit and scope of the invention.

As described above, by knowing the camera parameters (b, f and w), a disparity image can be converted into a range map. Illumination and camera settings such as focus and lens aperture can have a notable influence in obtaining a good disparity image. The objective is to reduce low textured areas in order to obtain the maximum number of matches.

A disparity image can represent the 3-dimensional coordinates of an area with respect to camera position at any given moment in time. The image can show a 3-dimensional representation of crop rows in a field. In generating the disparity images, the computer 14 matches common features found in the stereo images and calculates depth information based on the common features. The disparity image can comprise a three dimensional representation of an area corresponding to the area shown in the stereo images. X and Y dimensions can be shown in the image itself and the Z dimension can be represented by varying the image intensity. For example, the closer an article is to the camera, the brighter it appears in the disparity image. Black portions of the disparity image indicate areas where no disparity data is available.

Figure 3:
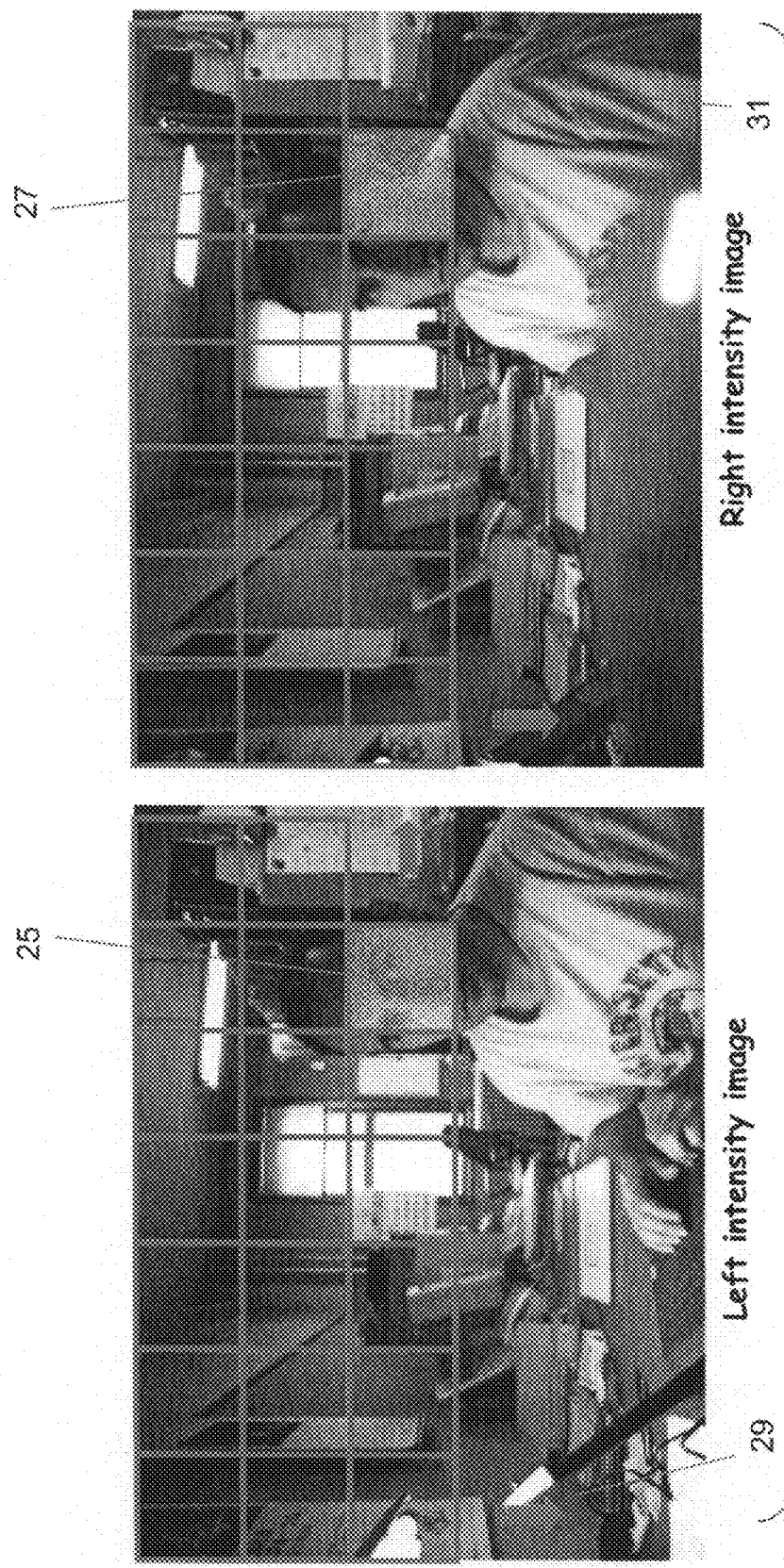
FIG. 3 is a diagrammatical representation of left and right stereo images of one embodiment being converted into a disparity image according to the present invention.

One process for generating a disparity image according to one embodiment of the present invention is shown in FIG. 3 and can be summarized as follows. User-set windows or correlation windows, 25, 27 can be configured to scan both the left and right images, 29 and 31, respectively. This windows 25, 27 can be configured to move from left to right and up to down to cover the whole image. In every position checked by the windows 25, 27, the left image window 25 can be compared to the right image window 27. The window size, typically expressed in pixels, can be configured by the user but is generally in the range of 5×5 to 21×21. Windows too small in size increase the noise of the matching process, while windows that are too large can tend to smear foreground objects.

Pattern recognition techniques can be internally applied to identify the same features in both images and therefore compute the disparity value for every match as described above. Once a match is found, the coordinates of that particular point can be expressed in terms of X and Y coordinates and a range (R) as described above. A filtering engine can be included with the pattern recognition techniques for detecting and eliminating mismatches.

For example, if the general height of an object is known, one sample filtering routine can be to eliminate all points having a Z dimension higher than the expected height of the object. In another embodiment where ground images are mapped using a camera mounted at an angle on a ground based vehicle, described in more detail below, the filtering routine can be configured to regard any point on the rear side 15 of the camera as noise (see FIG. 12). Also, in any system in which the Z coordinate represents the height from the ground, points having a negative Z coordinate (below ground) can be regarded as noise. These are just a few of the many possible filtering methods that can be used in accordance with the present invention.

The matching process can be executed by a computer program running on processing computer 14. If a match is detected by the computer 14, a green pixel can be generated in the disparity image with the coordinates of a sensed point being a reasonable estimate of the real point of the scene. Occasionally mismatches are detected by the computer 14 that are not filtered by a filtering engine, or result from other circumstances such as a wrong application of the camera calibration information or even electronic noise generated in the image acquisition phase for example. If a mismatch is detected by the computer 14, the pixel can be mapped in black signifying that no disparity information is available and no coordinates can be calculated for that position. While these mismatch pixels do not yield any information in the final 3-D maps, they are not confusing to they system and thus can be dealt with in an appropriate manner.

In one embodiment of the present invention, two types of 3-D agricultural maps can be generated. First, 3-D local maps can be generated using a system according to the present invention. Second, the local maps can be merged to create a 3-D global map of the agricultural scene.

The local maps can comprise a 3-D representation of a scene where all the points portrayed on the maps refer to a center of coordinates fixed to the stereo camera 12. The fact that the system of coordinates is fixed to the camera 12 implies that all the information contained in local maps is local information, that is to say that different camera shots will generate different local maps with no apparent relationship between them. The camera 12 mounted on a vehicle 16 moving through a field can generate a series of independent local maps.

A system 10 according to the present invention can produce a local map comprising a 3-dimensional representation of a field scene contained in one pair of stereo images. A local map can be used to obtain a guidance directrix of a vehicle, to record physical features of the field scene, or as an intermediate step to build a global map. A local map can be generated using the images obtained from the stereo camera 12 and the coordinate arrays. Generating the local map typically comprises performing a coordinate transformation and noise filter.

The merging process of assembling a global map can be carried out by defining a common center of coordinates for the local maps. This can be done using the geographic location information recorded by the location tracking device 18 for every local map location. In addition, the orientation of the camera 12, such as yaw angle which is sensed by an inertial sensor, can be included with each local map. Combining the local maps with their associated geographic location information can produce a global map which shows the features of an agricultural scene in terms of real world Cartesian coordinates.

In order to generate a global map, the system 10 can also include a location tracking device 18. The location tracking device 18 is configured for providing geographic location information of the camera 12 so that the coordinate array information can be mapped to specific geographic locations. One example of a location tracking device 18 is a GPS system. One example of geographic location information can include latitude, longitude, and altitude information. In addition, inertial sensors (not shown) can be included if the vehicle 16 is an aircraft, such as a helicopter. The computer 14 can be configured for storing the geographic location information corresponding to the stereo images.

In one embodiment of the invention, the process of generating a local map includes an image acquisition phase and a rendering phase. The image acquisition phase can comprise acquiring stereo images of an agricultural field scene, computing a disparity map based on the stereo images, and obtaining local coordinate arrays of the points of the agricultural field scene represented in the stereo images. The rendering phase can comprise rendering a 3-D map based on the coordinate arrays.

The computer 14 can be configured with an algorithm 26 for capturing and processing the stereo images from the camera 12 in an image acquisition phase. As shown in FIG. 4, the algorithm can be configured to grab images 28, rectify the images 30, compute disparity and generate a disparity image 32, and compute Cartesian coordinates 34. In addition, the algorithm 26 can be used to calibrate the camera 12 and output 36 various calibration parameters and image information to the computer 14 for storage. The algorithm 26 can also be configured to receive the geographic location information of the camera 12 from the geographic positioning unit 18 and to output 36 the geographic location information to the computer 14 for storage along with the other camera information. In one embodiment, the algorithm 26 output includes the left and right images captured by the stereo camera 12, the original disparity image computed by the algorithm 26, camera calibration and image parameter information, a manipulated (filtered) disparity image, Cartesian coordinates arrays, and geographic location information. The algorithm 26 can also be used to set disparity parameters, such as the correlation windows 25, 27, the number of disparities per pixel, etc.

In one embodiment of the invention, the algorithm 26 has the ability to run continuously receiving realtime information from the stereo camera 12. Alternatively, the algorithm 26 can be configured to receive stereo image information offline from stored files. The algorithm 26 can have the ability to read camera calibration parameters and perform image rectification. The algorithm 26 can also compute the disparity image and save numerical disparity information in an array. It can be equipped with disparity image processing capabilities such as filtered points elimination, range separation, etc. and can be configured to compute three-dimensional coordinate arrays.

Figure 5:
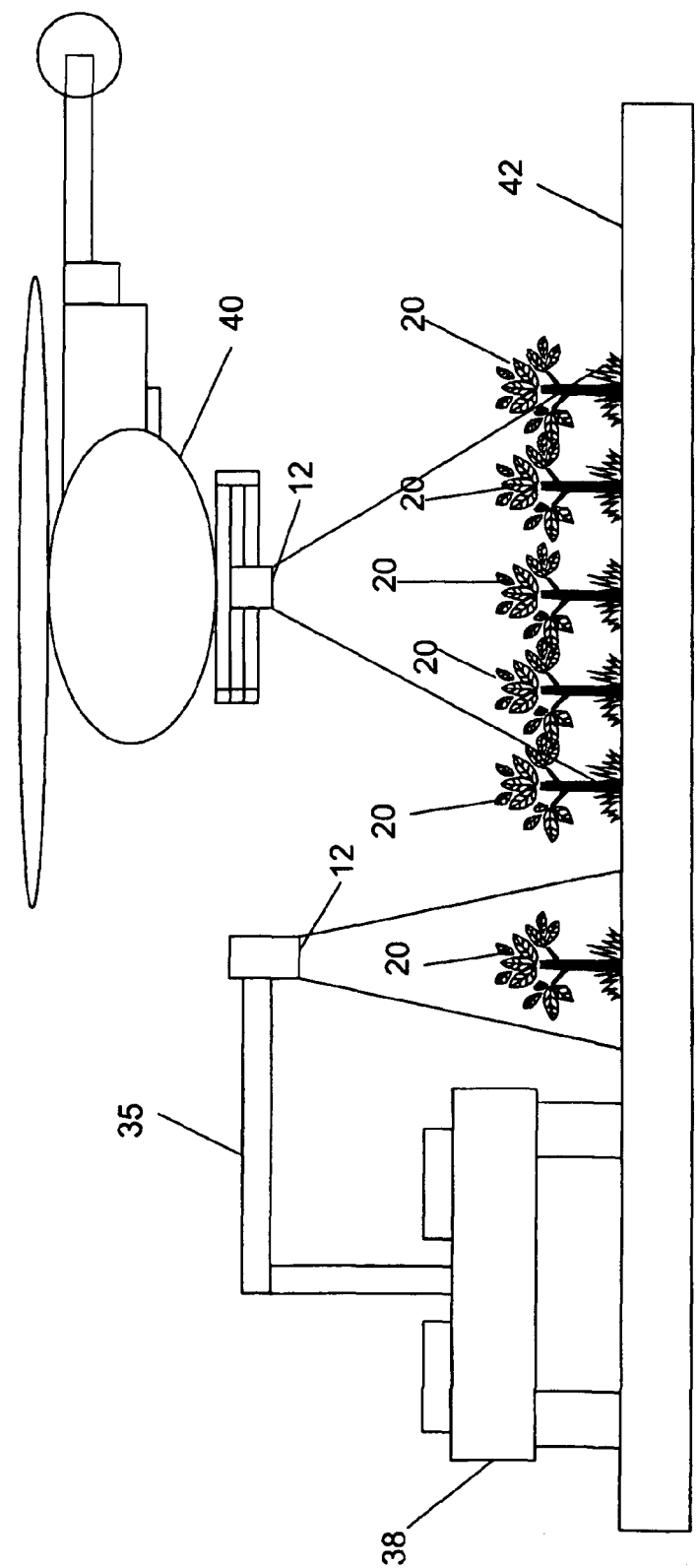
FIG. 5 is a diagrammatical representation of one embodiment of various setups for acquiring stereo images of an agricultural field scene according to the present invention.

The stereo images can be taken from a variety of different viewpoints and/or angles depending on the final application. For example, aerial images can be used to study the canopies of trees in an orchard or the overhead position of crop rows in a field. The stereo camera 12 can be mounted on any suitable vehicle 16 for obtaining the aerial images. For example, as shown in FIG. 5, the camera 12 can be mounted on a ground vehicle 38, such as a tractor or Gator utility vehicle, or on an aircraft 40, such as an unmanned helicopter. If used with a ground vehicle 38, the camera 12 can be mounted using a rigid frame 35 in such a way that the camera 12 is placed approximately parallel to the ground 42. One advantage of this configuration is its accuracy and ease of measuring the distance between the camera 12 and the ground 42. If used with an aircraft 40, such as a helicopter, the camera 12 can be mounted on the underside of the helicopter and the helicopter can be employed to fly over the agricultural field scene parallel to the ground 42. One advantage of this configuration is that images can be acquired under any ground condition since the helicopter does not travel on the ground.

Images are collected by the camera 12 and every point sensed by the camera 12 is initially related to the camera's system of coordinates as described above. In order to obtain a more intuitive representation, a transformation can be conducted in which the X and Y coordinates remain with the same orientation, but the range R (distance between the camera 12 and object 20) is transformed into the object 20 height related to the ground 42.

Figure 6:
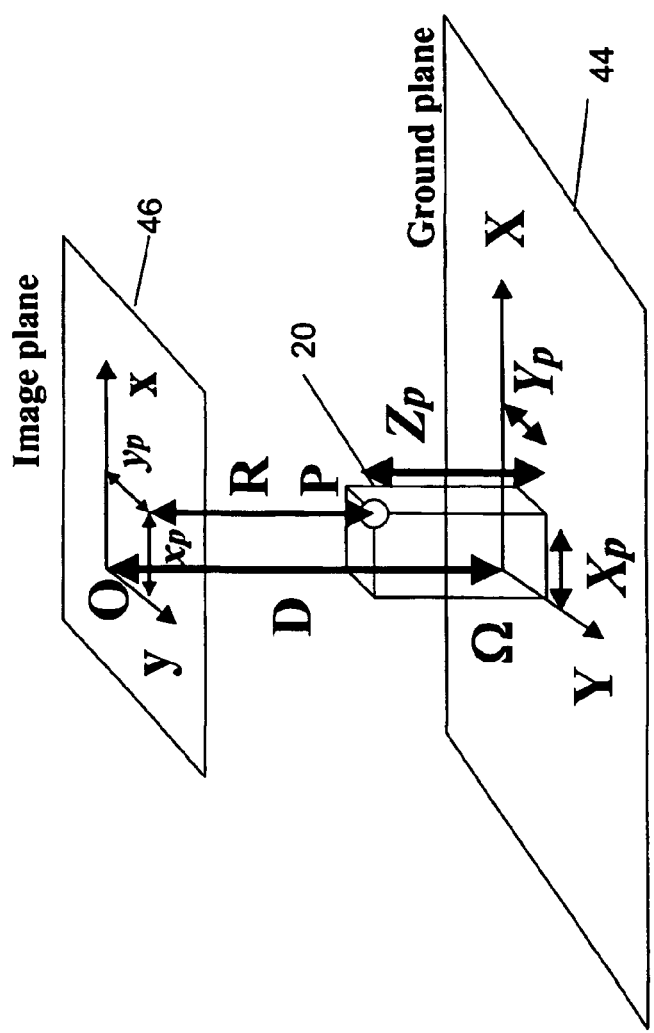
FIG. 6 is a diagrammatical representation of the geometry associated with one embodiment of a coordinate transformation from camera coordinates to ground coordinates.

FIG. 6 illustrates the transformation from camera-object range to object-ground range. The geometric relationship between the coordinates is given as follows:

$$\begin{bmatrix} X \\ Y \\ Z \end{bmatrix} = \begin{bmatrix} T & 0 & 0 \\ 0 & T & 0 \\ 0 & 0 & -1 \end{bmatrix} \cdot \begin{bmatrix} x \\ y \\ R \end{bmatrix} + D \cdot \begin{bmatrix} 0 \\ 0 \\ 1 \end{bmatrix}$$

Where:
P Sensed point
Oxy System of coordinates in image plane
ΩXYZ System of coordinates for each individual scene (local map)
$Z_p$ Height of sensed point
R Range of sensed point (distance camera-object)
D Height of the camera (distance camera-ground)
T Transformation parameters
$(X_p, Y_p, Z_p)$ Point coordinates in local map system of coordinates
$(X_c, Y_c, Z_c)$ Camera coordinates
and where:

$$T = \frac{w \cdot R}{f}$$

Where:
w size of pixels
f focal length

As can be seen from FIG. 6, the ground plane 44 corresponds to the ground 42 and the image plane 46 corresponds to the camera 12 location. Using this transformation, the point coordinates $(X_p, Y_p, Z_p)$ of the object 20 can be calculated with respect to the ground plane 44. In other words, the point coordinates $(X_p, Y_p, Z_p)$ correspond to the location of the object 20 from the perspective of a person at ground level.

One difficulty in making this transformation is estimating the camera to ground distance (D). With ground vehicles 38, the height of the camera 12 is relatively fixed after the camera 12 is installed on the vehicle 38. However, the camera to ground distance (D) for an aircraft 40 must be calculated since the distance is not fixed.

Figure 7B:
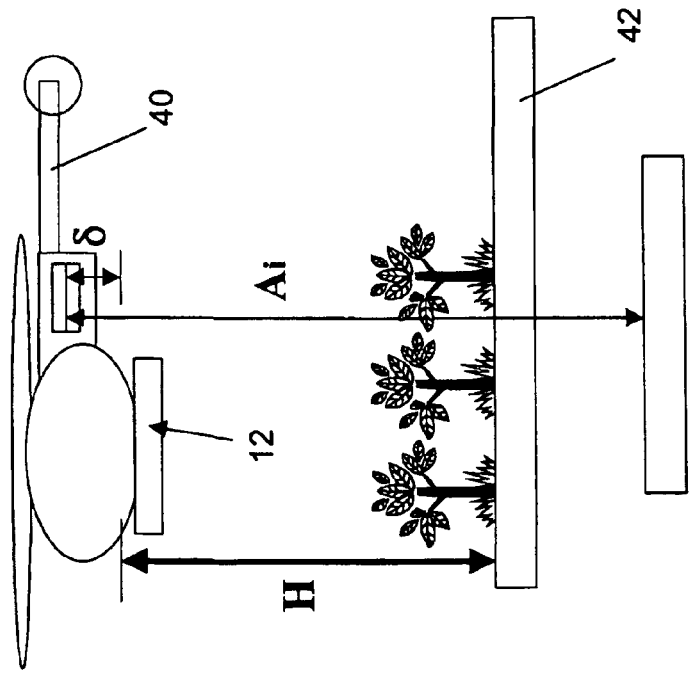
FIGS. 7a and 7b are diagrammatical representations of one embodiment of an aircraft acquiring stereo images of an agricultural field scene according to the present invention.
Figure 7A:
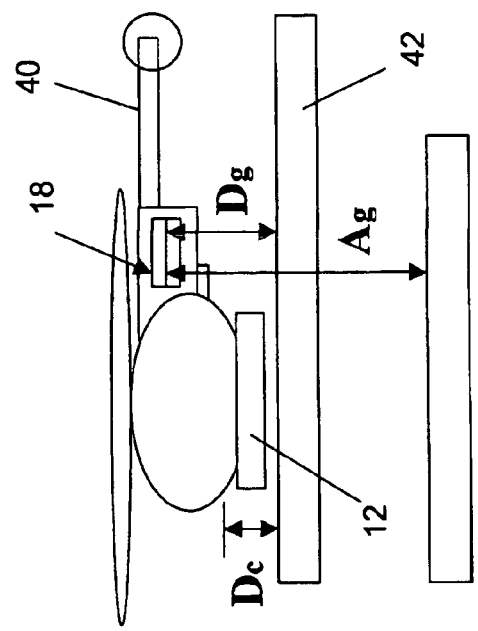

In one embodiment, the aircraft 40 is equipped with a GPS receiver as a location tracking device 18 as described above. The GPS receiver 18 can be used to record altitude data for every image taken by the stereo camera 12. Height differences are easily determined based on the altitude data. FIG. 7a shows this embodiment with an aircraft 40 on the ground and FIG. 7b shows this embodiment with an aircraft 40 in the air over the agricultural field scene of interest. Referring to FIGS. 7a and b, the ground 42 to camera 12 distance (D) can be determined as follows:

$$\delta = D_g - D_c$$

$$H = (A_i - A_g) + D_g - \delta = A_i - A_g + D_c$$

Where:
$D_c$ is the ground 42 to camera 12 distance when the aircraft 40 is on the ground;
$D_g$ is the distance of the GPS 18 from the ground 42 when the aircraft 40 is on the ground 42;
δ is the distance between the GPS 18 and the camera 12;
$A_g$ is the altitude of the aircraft 40 measured when the aircraft 40 is on the ground 42;
$A_i$ is the altitude of the aircraft 40 when taking image i from the air; and
H is the aircraft 40 height related to the ground 42 of the field.

In this case, $D_c$ can be manually measured while $A_g$ and $A_i$ can be given by the output of the GPS.

Figure 8:
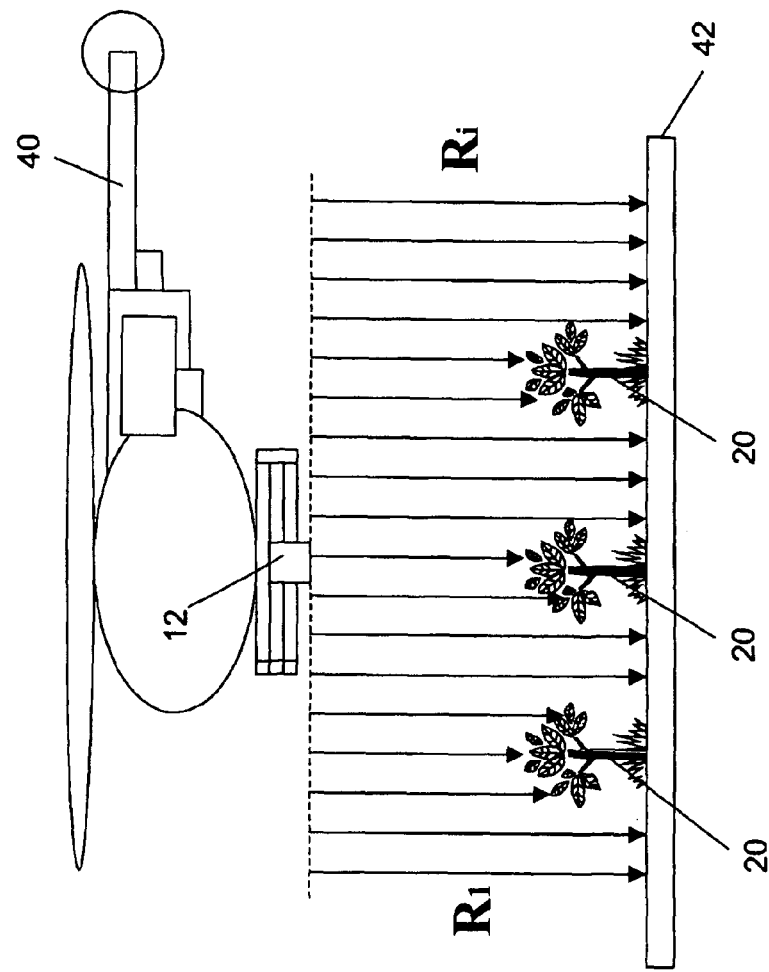
FIG. 8 is a diagrammatical representation of another embodiment of an aircraft acquiring stereo images of an agricultural field scene according to the present invention.

In another embodiment, the camera to ground distance (D) is merely set to the highest range (R) value sensed by the camera 12. Since every sensed point that has a disparity is provided with a range value, it is assumed that the largest range value is the distance between the camera 12 and the ground 42. This concept is illustrated in FIG. 8. As shown, an array of range values ($R_1$ to $R_i$) are calculated and the ground 42 to camera 12 distance (D) is calculated as:

$$D = \max(R_i)$$

Noise filtering can be used to minimize or reduce false matches caused by the stereo algorithm 26 which could affect the ground 42 to camera 12 distance calculation. In addition, or alternatively, an average of the n largest ranges can be calculated and used as the distance (D), further minimizing the affect of false matches.

In another embodiment, a field of view/area sensed methodology can be employed to determine the ground 42 to camera 12 distance (D). This methodology requires some knowledge of the sensed area as well as the field of view (vertical and horizontal) of the camera 12. The field of view of the camera 12 is an external parameter which can be obtained from the manufacturer of the camera lenses. It can also be calibrated in the field by applying basic principals of geometry.

Figure 9:
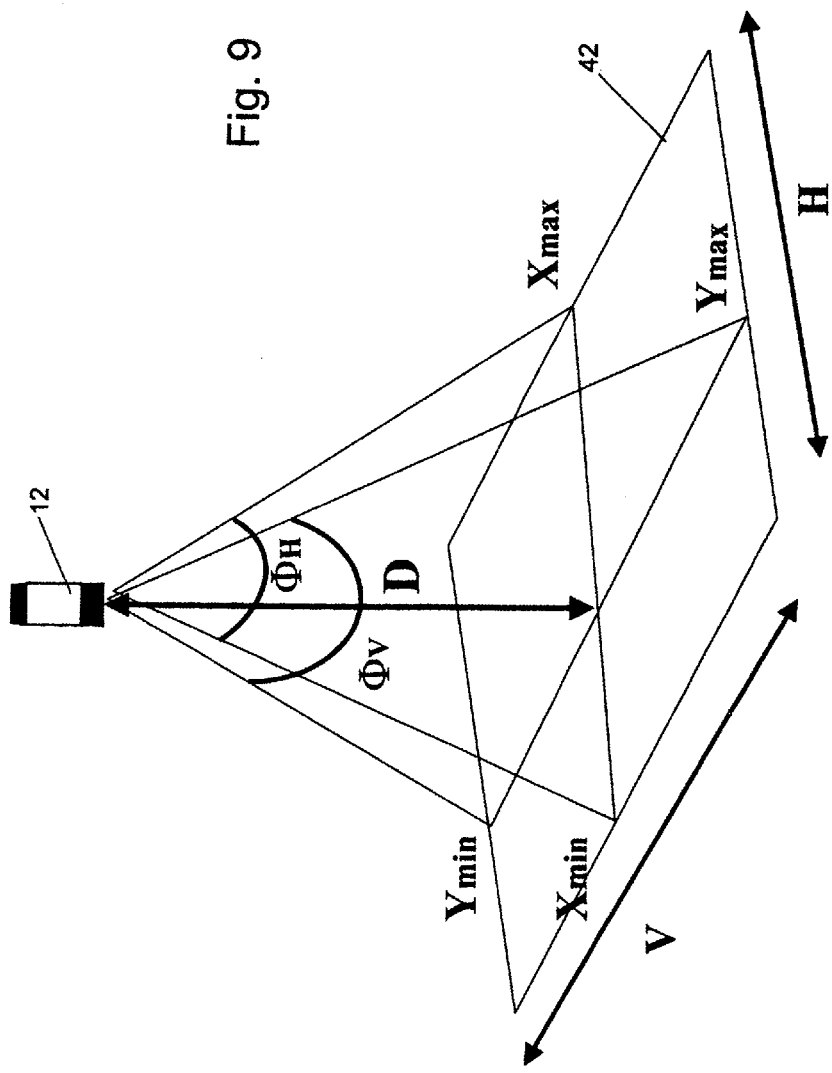
FIG. 9 is a diagrammatical representation of one embodiment of the geometry associated with computing the ground to camera distance according to the present invention.

Referring now to FIG. 9, one field of view/area sensed methodology for computing ground 42 to camera 12 distance (D) is illustrated. In this embodiment, the field of view or area sensed by the camera 12 is estimated by using the maximum and minimum X and Y coordinates from the arrays produced by the algorithm 26 to determine the perimeter dimensions (H and V) of the area sensed. The perimeter dimension estimates are calculated as follows:

$$H = X_{max} - X_{min}$$

$$V = Y_{max} - Y_{min}$$

Then using the vertical and horizontal field of view angles ($\phi_v$ and $\phi_h$, respectively) two height calculations ($h_1, h_2$) can be made as follows:

$$h_1 = \frac{V}{2 \cdot tg\left(\frac{\phi_v}{2}\right)}$$

$$h_2 = \frac{H}{2 \cdot tg\left(\frac{\phi_H}{2}\right)}$$

Theoretically, $h_1$ and $h_2$ will both equal the ground 42 to camera 12 distance (D). Alternatively, the average of the $h_1$ and $h_2$ can be calculated and used as the ground 42 to camera 12 distance (D).

This methodology relies on the accuracy of the X and Y coordinates, whereas the maximum range methodology, described above, depends on the precision of the Z coordinate. Noise filtering can be included for obtaining more accurate $X_{max}$, $X_{min}$, $Y_{max}$, and $Y_{min}$ values thus producing more accurate $h_1$, $h_2$, and D values.

In another embodiment, lasers can be used for measuring the ground 42 to camera 12 distance (D). A laser diode can be mounted on the aircraft 40 and can be configured to produce a thin laser beam aimed at the ground 42. This method could be used to obtain highly accurate Z coordinates and could be combined with the maximum range methodology described above for determining the ground 42 to camera 12 distance (D).

While a few example embodiments have been discussed herein, other means and methods of determining the ground 42 to camera 12 distance (D) can also be used without departing from the spirit and scope of the invention.

Figure 11:
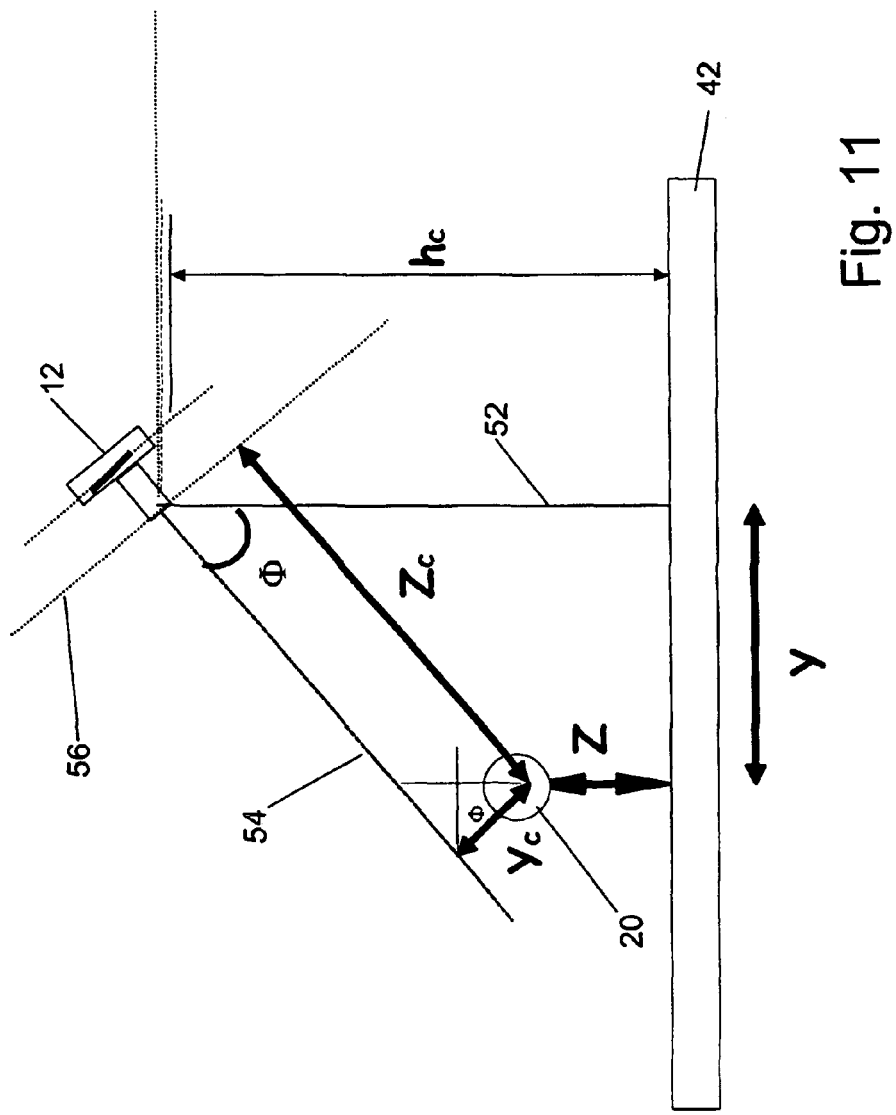
FIG. 11 is a diagrammatical representation of one embodiment of a system for acquiring ground-based images of an agricultural field scene according to the present invention.

The invention can also be used for producing 3-D agricultural field scene maps based on ground images, as opposed to aerial images. Similar to the system described above, in another embodiment of the invention shown in FIG. 11, the camera 12 is mounted on a ground vehicle 38 and can be angled toward the ground 42 at a tilt angle (φ) for obtaining ground images. The tilt angle, defined as the angle between perpendicular 52 to the ground 42 and perpendicular 54 to the camera 12, can be varied based on the specific application of the invention. In one sample embodiment, a tilt angle (φ) of between 60° and 90° can be suitable. One factor that typically needs to be addressed in acquiring ground images is the relative position and orientation of the camera 12 with respect to the scene. In doing so, the tilt angle (φ) and camera height ($h_c$) can be useful and can usually be easily measured.

As described above, the algorithm 26 outputs, among other things, the camera coordinate arrays denoted as $X_c$, $Y_c$, and $Z_c$. In one embodiment of the invention, the center of coordinates is set at the left lens focal point. The depth or range ($Z_c$) is the distance between the targeted object 20 and the camera plane 56 and the $X_c$-$Y_c$ plane coincides with the camera plane 56. As such, it can be helpful to transform the camera coordinates into ground coordinates. Ground coordinates can be defined as coordinates in which the Z coordinate gives the height of the object 20, the X and Y coordinates give the distance between the object 20 and the camera 12. One way to perform the camera coordinates to ground coordinates is as follows:

$$\begin{bmatrix} X \\ Y \\ Z \end{bmatrix} = \begin{bmatrix} 1 & 0 & 0 \\ 0 & -\cos\phi & \sin\phi \\ 0 & -\sin\phi & -\cos\phi \end{bmatrix} \cdot \begin{bmatrix} X_c \\ Y_c \\ Z_c \end{bmatrix} + h_c \begin{bmatrix} 0 \\ 0 \\ 1 \end{bmatrix}$$

Figure 12:
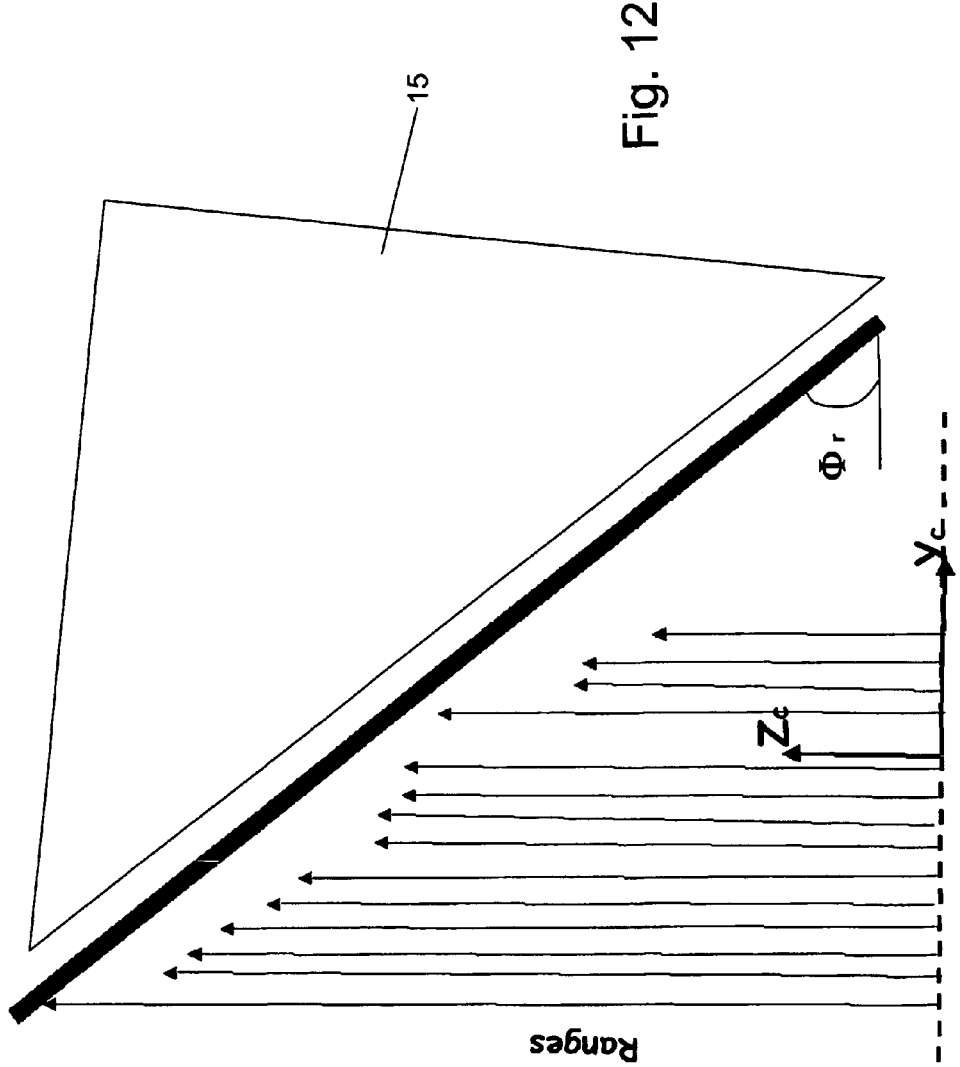
FIG. 12 is a diagrammatical representation of one embodiment of noise filtering according to the present invention.

Where:
($X_c$, $Y_c$, $Z_c$) Camera coordinates
(X, Y, Z) Ground coordinates
$h_c$ Camera height
φ Camera tilt angle One method of noise filtering associated with this embodiment of the invention is shown in FIG. 12. As one can readily appreciate, since the camera 12 is pointed at an angle downward toward the ground, values of $Z_c$ that would be located behind the camera 12 in area 15 can be ignored as noise.

It should be noted that other well-known coordinate transformations are contemplated and could be used in accordance with the various embodiments of the invention described herein as well as in accordance with the invention in general.

Figure 10:
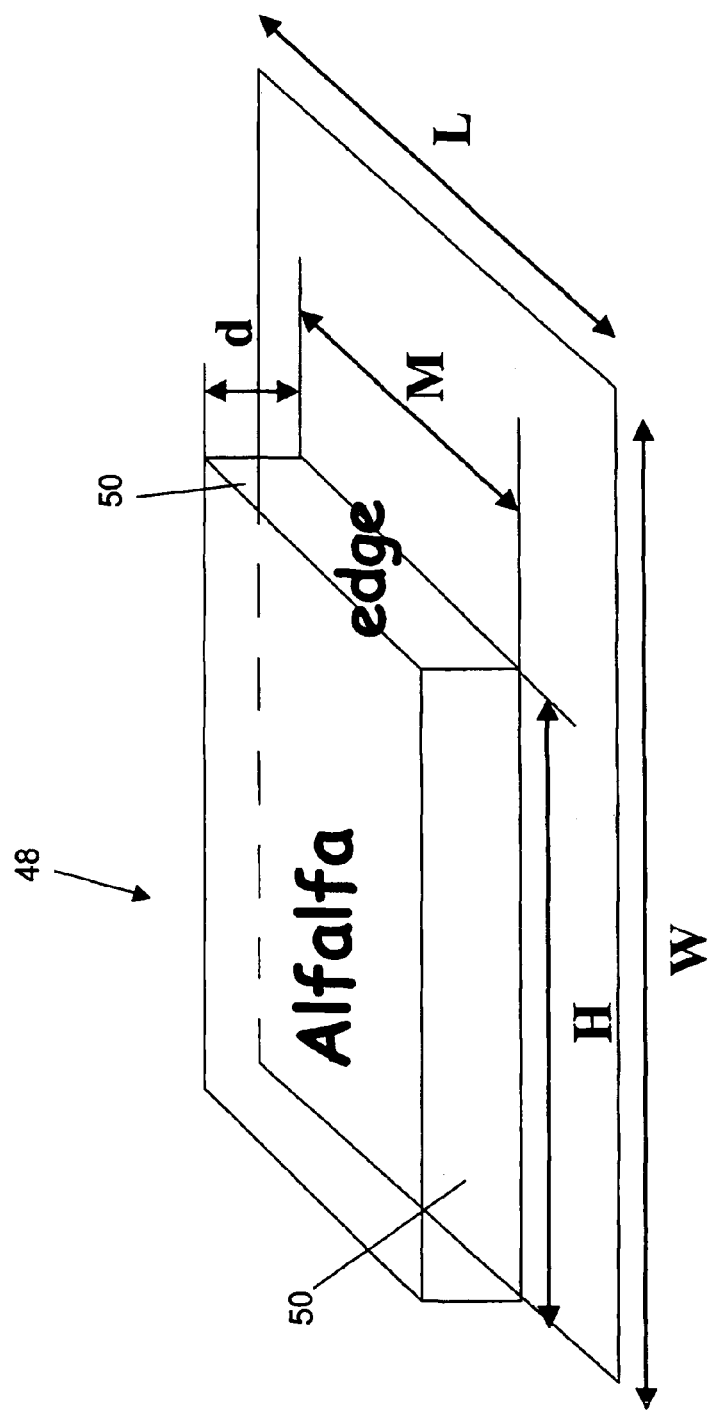
FIG. 10 is a diagrammatical representation of one embodiment of estimating the volume of crops in an agricultural field scene.

As described above, aerial images can also be obtained from a stereo camera 12 mounted on a ground vehicle 38. Typically a camera 12 mounted on a ground vehicle 38 is much closer to the objects, such as crops, than a camera 12 mounted on an aircraft 40. Images obtained from a camera 12 mounted on a ground vehicle 38 can be used for in a variety of applications, such as to estimate the volume of extensive crops like barley, wheat, alfalfa, etc. One method for estimating the volume of an area of crops 48 is illustrated in FIG. 10.

Every pixel having disparity information will yield a set of coordinates (X, Y, Z) as described. The edge 50 of a volume of crops can be detected as a transition point in the Z coordinate. Differences in the X and Y for selected points (such as $X_{max}$, $X_{min}$, $Y_{max}$, $Y_{min}$, and the edges as determined by the Z transition points) can be used to determine W, H, M, and L. In one embodiment, an average of ranges for the crop area (as marked by the Z transition points) can be used to calculate d.

From these parameters, the volume of the crop under the area captured by the camera 12 can be estimated by applying the following expression:

Volume=$H*M*d$

It can also be readily appreciated that this method can also be used for, among other things, identifying the cut-uncut edge of crops in a field or for identifying the crop-ground boundaries of crop rows.

As described above, in one embodiment of the present invention, two types of 3-D agricultural maps can be generated: local maps and global maps. Local maps are 3-D representations of a scene where all of the points portrayed refer to a center of coordinates fixed to the camera. Therefore the position of the system of coordinates travels attached to the camera. The fact that the system of coordinates is fixed to the camera implies that all the information contained in local maps is local information, that is to say, different camera shots will generate different local maps with no apparent relationship between them.

In one embodiment in which a camera is mounted on a vehicle moving through a field, a series of independent local maps will be generated. A connection between the independent local maps can be made with the introduction of global information, such as GPS information, thus forming a global map. Thus, in one embodiment, the process of generating a 3-D global map can comprise a two steps: a local map generation step and a global map assembly step. The local map generation step can comprise image acquisition, coordinate transformation and global position recording of every set of images. The results of this step would be a series of 3-D image clouds of individual images and the location of the camera in the field, possibly given in geodetic coordinates, for every image. The global map assembly step can include merging the individual local images into a unique maps with a common center of coordinates. To do so, the camera position information associated with each individual image can be used to relate the individual images to the common center of coordinates. In addition to camera position information, the camera's orientation, such as yaw angle, may be used to relate the individual images.

One of the first steps in the fabrication of a global map from local maps is determining the location at which the images used to generates the local maps were taken. As described above, a computer algorithm 26 implemented for image acquisition can incorporate GPS information for every image taken. During assembly of a global map, transformations from camera coordinates (typically centered at the left lens) for objects captured in the images to global coordinates (East, North) will be performed. If the camera location information supplied by the location tracking device 18 is in the form of geodetic coordinates (latitude, longitude, and altitude), it is sometimes convenient to transform these coordinates into tangent plane coordinates (East, North) before doing the camera to global coordinates transformation. One method for transforming geodetic coordinates to tangent plane coordinates comprises first transforming the coordinates from geodetic to Earth-Centered Earth-Fixed (ECEF) coordinates and second transforming the ECEF coordinates to tangent plane coordinates.

Figure 13:
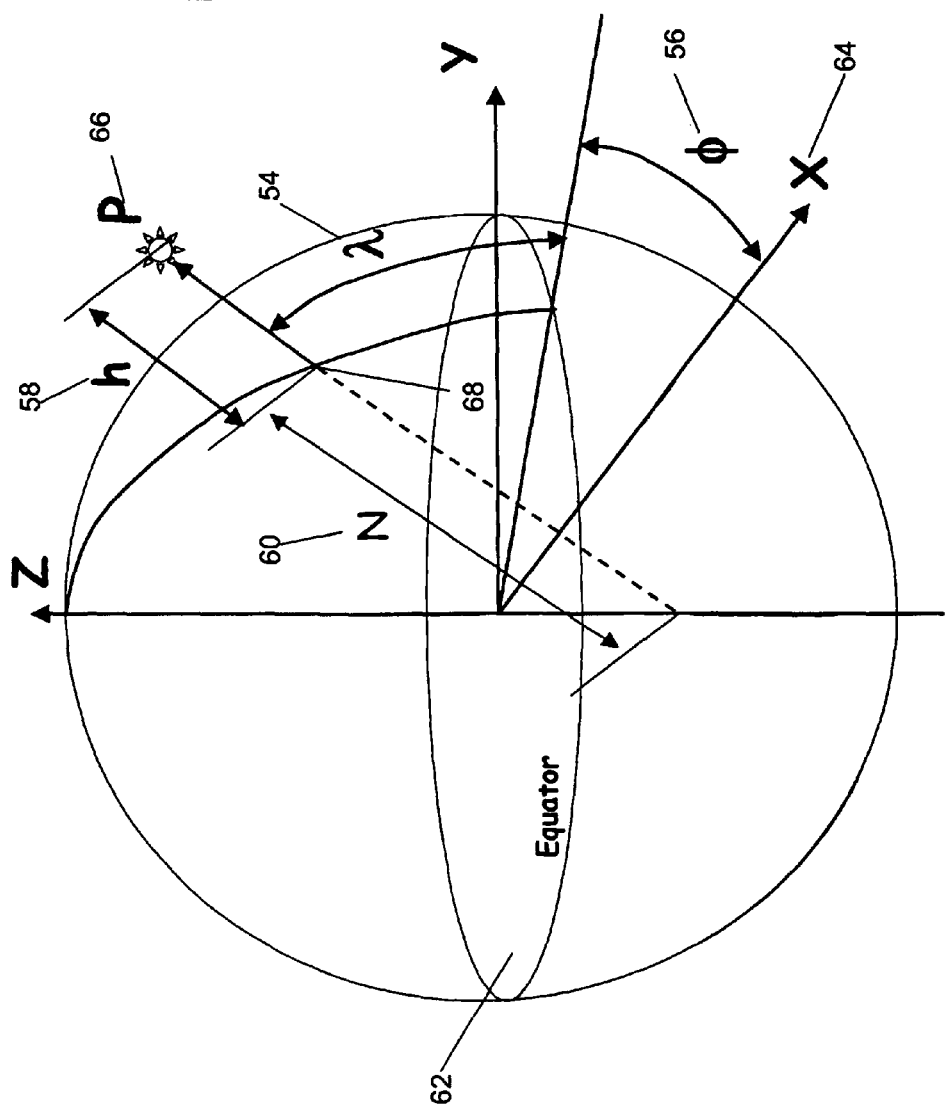
FIG. 13 is a diagrammatical representation of one embodiment of a geodetic coordinate system.

FIG. 13 illustrates the geodetic coordinate system. Geodetic coordinates are expressed as latitude 54 (λ), longitude 56 (φ), and altitude 58 (h). Latitude 54 is the angle between the normal plane 60 (N) and the equatorial plane 62. Longitude 56 is the angle in the equatorial plane 62 between X 64 and the projection of the point of interest 66 (P). Altitude 58 is the (normal) distance between the surface of the earth 68 and the point of interest 66 (P).

Figure 14:
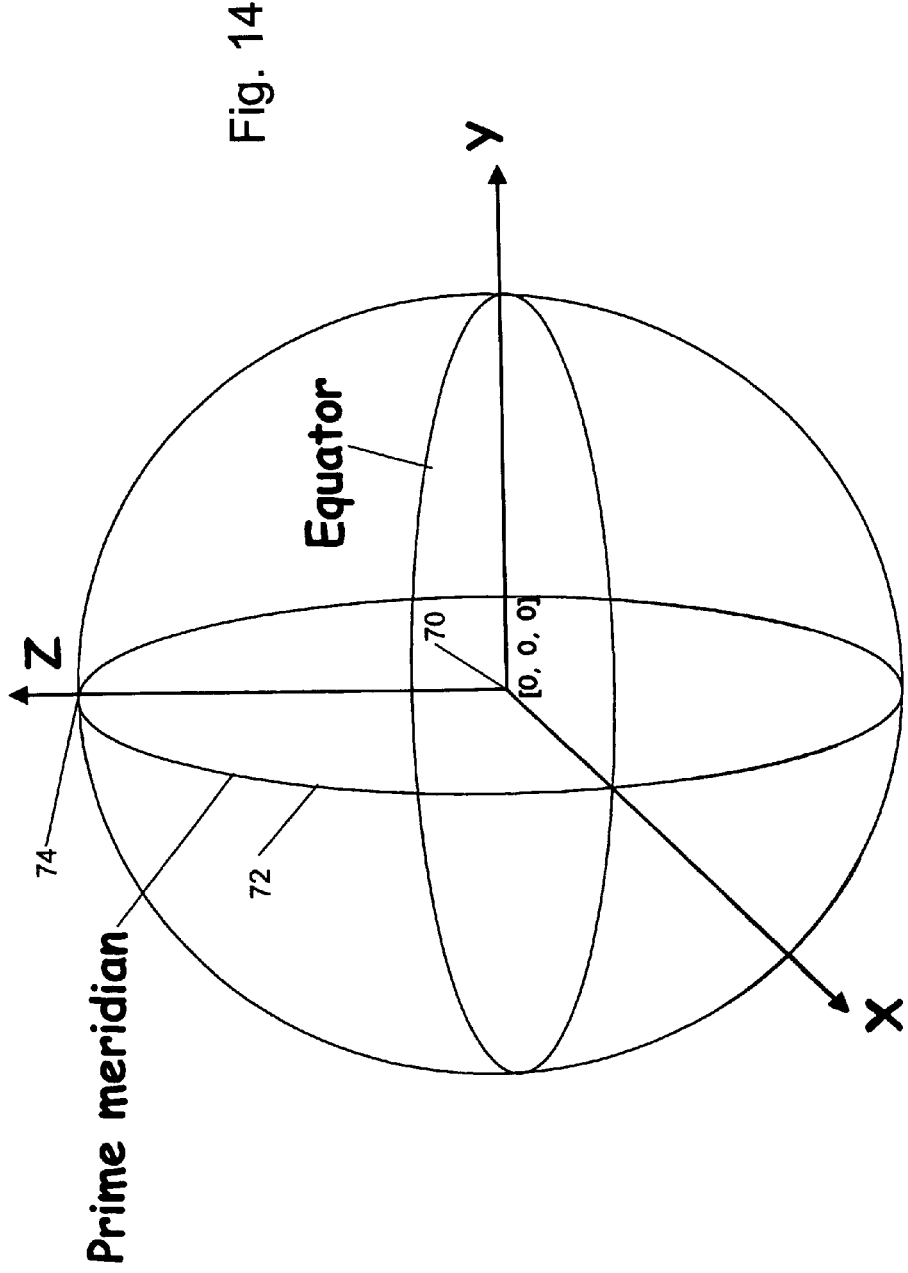
FIG. 14 is a diagrammatical representation of one embodiment of an ECEF coordinate system.

FIG. 14 illustrates the ECEF coordinate system. The center of coordinates of the ECEF frame is the center of the earth 70. The X axis passes through the intersection of the prime meridian 72 (0° latitude). The Z axis is parallel to the earth's spin axis and extends through the true north pole. The Y axis complete the right-handed coordinate system.

Figure 15:
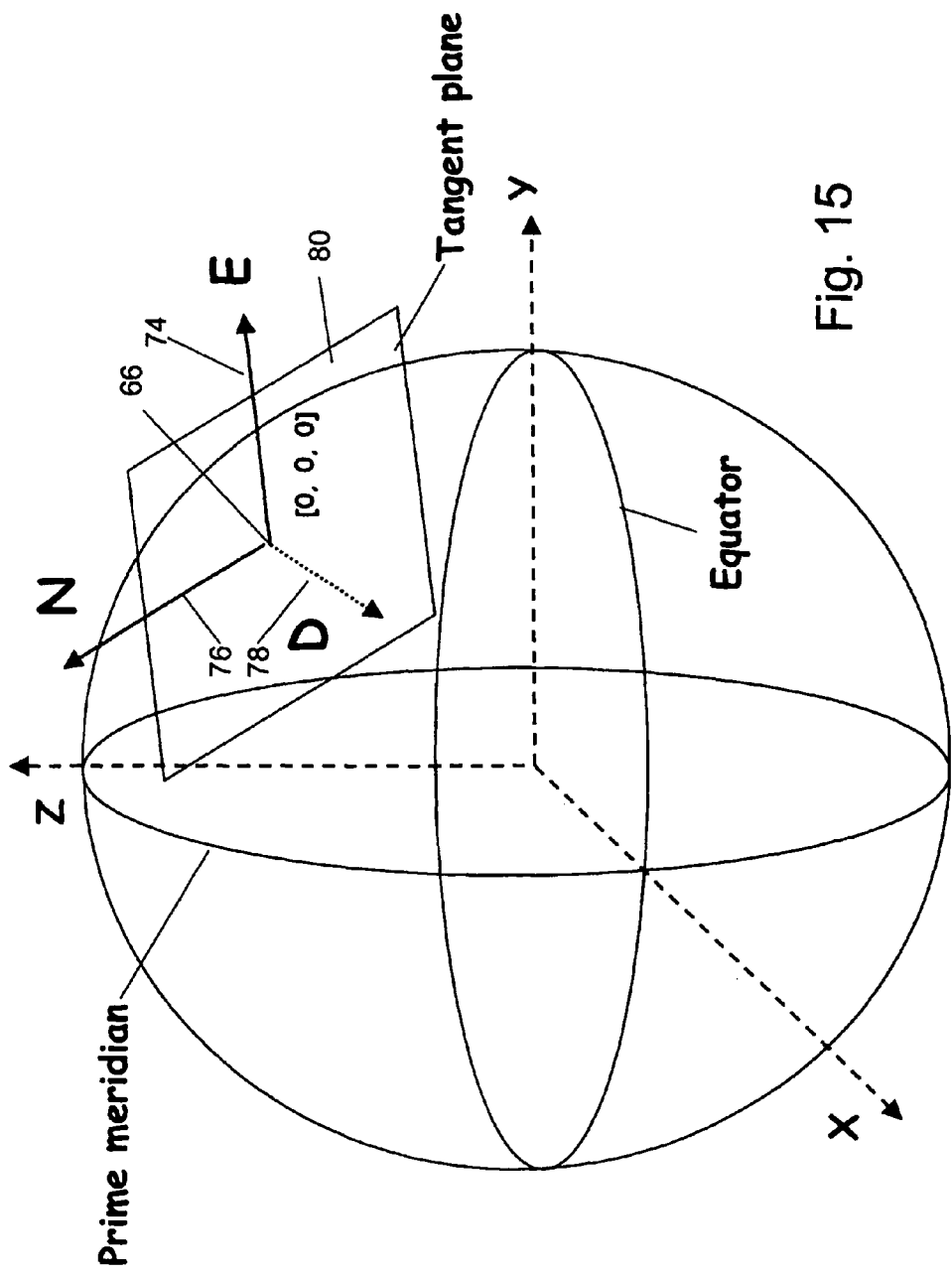
FIG. 15 is a diagrammatical representation of one embodiment of a local tangent plane coordinate system.

FIG. 15 illustrates the local tangent plane coordinate system. The local tangent plane coordinates system, also known as NED coordinates system, has three orthogonal axes of East 74 (E), North 76 (N) and Down 78 (D). Tangent plane coordinates are generated by fitting a tangent plane 80 to the earth's surface at the point of interest 66.

In one embodiment of the invention, the World Geodetic System 1984 (WGS84) can be adopted as a reference to model the earth shape for making the geodetic to ECEF transformation. Under WGS84 uses the following parameters to model the earth's shape:

| | |
|---|---|
| Semi-major axis | a = 6378137 |
| Semi-minor axis | b = a (1 − f) = 6356752.31424518 |
| Ellipsoid flatness | f = (a − b)/a = 0.00335281 |
| Eccentricity | $e = \sqrt{f(2-f)} = 0.0818$ |
| Length of Normal | $N(\lambda) = \dfrac{a}{\sqrt{1 - e^2 \sin^2(\lambda)}}$ |

The length of the normal to the earth is the distance from the surface of the earth to its intersection with the Z-axis (see FIG. 13). The relationship between geodetic and ECEF coordinates is given by:

$$X = (N+h)\cos(\lambda)\cos(\phi)$$

$$Y = (N+h)\cos(\lambda)\sin(\phi)$$

$$Z = [N(1-e^2)+h]\sin(\lambda)$$

In order to compute the position in the tangent plane, the origin of the plane (tangent point with the earth) must be defined. In the transformation described below, the coordinates of the origin are noted as $(X_0, Y_0, Z_0)$. In one embodiment of the invention, the origin of the tangent plane is selected to be the origin of the global map. The transformation between ECEF coordinates and tangent plane coordinates is given by:

$$\begin{bmatrix} \text{North} \\ \text{East} \\ \text{Down} \end{bmatrix} = \begin{bmatrix} -\sin\lambda \cdot \cos\phi & -\sin\lambda \cdot \sin\phi & \cos\lambda \\ -\sin\phi & \cos\phi & 0 \\ -\cos\lambda \cdot \cos\phi & -\cos\lambda \cdot \sin\phi & -\sin\lambda \end{bmatrix} \begin{bmatrix} X - X_0 \\ Y - Y_0 \\ Z - Z_0 \end{bmatrix}$$

Thus, using the equations listed above, an embodiment according to the present invention can convert the $(\lambda, \phi, h)$ coordinates supplied by the location tracking device into East and North camera coordinates. The Down coordinate can also be used to represent the camera 12 height, although other methods have been described for determining the camera 12 height.

Figure 16:
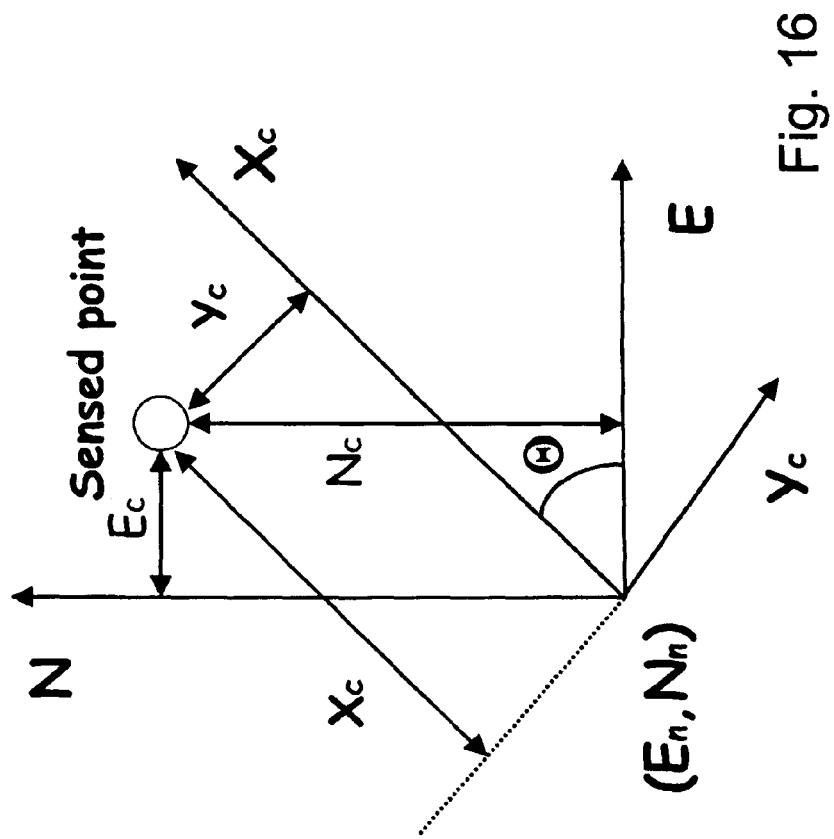
FIG. 16 is a diagrammatical representation of one embodiment of a camera to global coordinates transformation according to the present invention.

After the camera's center of coordinates has been converted to a global frame, coordinates of any point sensed in an image can be referred to a global frame. To do so, a transformation can be made between camera coordinates (centered at the left frame) and global coordinates (East, North) for the sensed points in the images captured by the camera. FIG. 16 illustrates one example of parameters of a camera to global coordinate transformation. In some cases in order to account for camera orientation, such as when the camera is secured to an aircraft as described herein, it is helpful to know the yaw angle $\Theta$ of the camera as every image is being acquired. This parameter can be recorded by a sensor, such as an inertial sensor. The transformation from camera coordinates to global coordinates can be accomplished as follows:

$$N = N_n + X_c \cdot \sin\Theta + Y_c \cdot \cos\Theta$$

$$E = E_c + X_c \cdot \cos\Theta - Y_c \cdot \sin\Theta$$

Where:
 N North coordinate of the sensed point in the global map
 E East coordinate of the sensed point in the global map
 $N_n$ North coordinate of the camera's center of coordinates for image n
 $E_n$ East coordinate of the camera's center of coordinates for image n
 $X_c$ X coordinate (local reference) of the sensed point to be transformed
 $Y_c$ Y coordinate (local reference) of sensed point to be transformed
 $\Theta$ Yaw angle for image n Once all the points sensed in the images captured by the camera have been transformed to a uniform set of coordinates (global coordinates in the example described herein), the local images can be merged into a global map.

As described herein, the process of creating a three-dimensional, global map of an agricultural scene begins with creating three-dimensional local maps. Local maps are generated from stereo images captured by a stereo camera. The images undergo coordinate transformations in order to generate a three-dimensional representation of the scene where all the points portrayed refer to a center of coordinates fixed to the camera.

Figure 17:
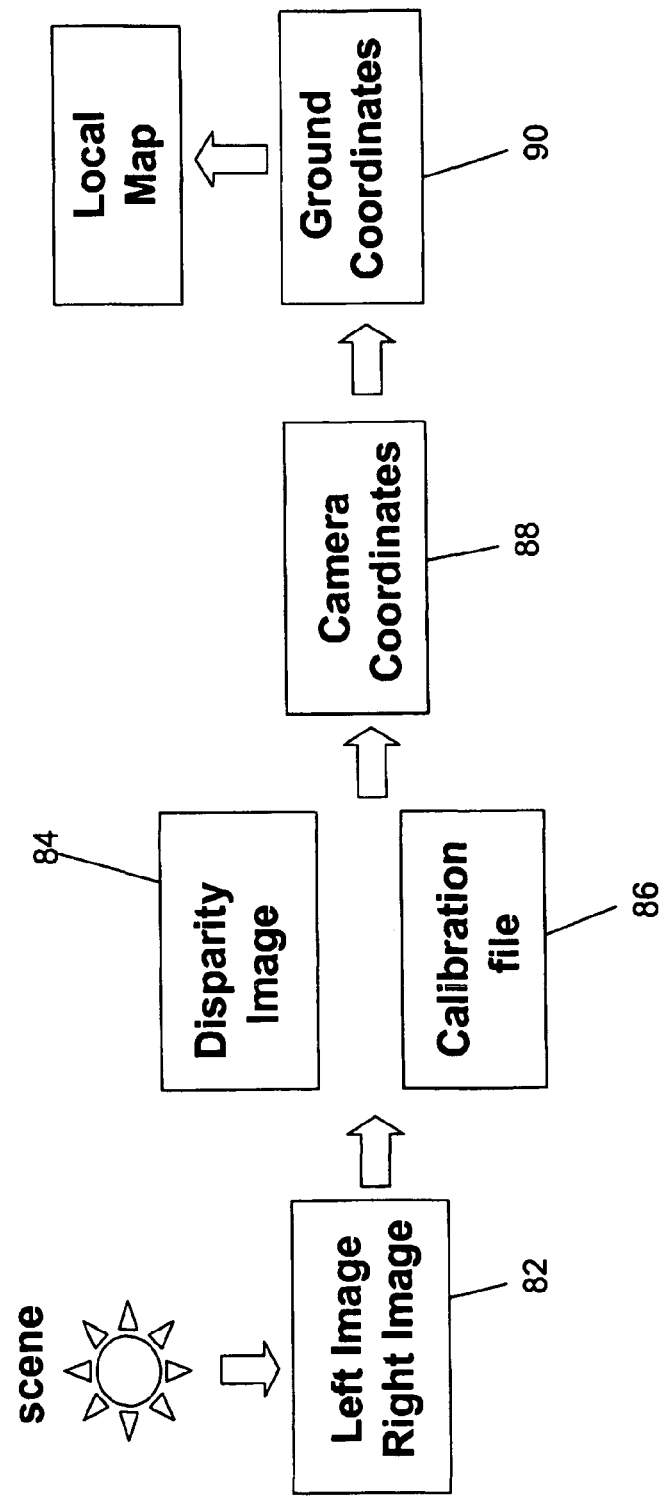
FIG. 17 is a diagrammatical representation of one embodiment of a process for generating a local map according to the present invention.

FIG. 17 illustrates one example of a process for generating a local map. The first step in the process is the image acquisition phase. In this phase, the camera grabs simultaneous left and right digital images of the scene (step 82). Next, the stereo engine (one example of which is algorithm 26) computes a disparity image (step 84) by finding and comparing points captured in both images. The camera calibration information is then retrieved (step 86) and used with the disparity image to produce the camera coordinates (step 88) for sensed points found in the images. Finally, the camera coordinates can be transformed into ground coordinates (step 90), using one of the method described above for example, to produce the local map.

Accuracy of the local maps is important both for use as a local map as well as for use in generating a global map. Properly determining the area covered by each local map can improve the accuracy of the local map and any global maps generated from the local map. For example, the resolution of the acquired images as well as perspective shown in the images can be accounted for in improving the accuracy of a local map.

Typically, image resolution is such that every pixel in an image possesses the same dimension. However, the volume covered by each pixel may not be the same. Perspective shown in an image can vary the volume of each pixel. For example, it is evident that pixels close to the horizon and vanishing point (far from the camera) can cover much more information than those in the foreground of an image (near the camera). Thus, the process for creating a local map can be configured to assign a higher reliability to objects detected close to the camera. In fact, in some situations it may be desirable to set maximum and minimum ranges in which image data collected outside the range is ignored. This range information can be useful for applying noise filtering routines as well as for determining the maximum distance between local maps in order to avoid void areas in a global map assembled from the local maps. Of course, the area covered by an image can depend on some of the camera's features such as lenses, baseline, camera tilt angle, image resolution, etc.

Separation by range intervals is one sample technique for reducing noise in disparity images. Since a disparity image is an image of ranges, disparity images can be divided into several images, each of them depicting a specific range interval (portion of the horopter). For example, the disparity image is divided into 5 separate image. If there are not objects of interest in the first interval, the data (including noise) associated with the first interval can be ignored. Similarly, if there are no objects of interest in the last interval, it to can be ignored. By eliminating the first and last intervals of range data, the noise associated with these ranges is also eliminated. Using this method it is possible to select only the ranges that captures objects of interest thus automatically eliminating the noise associated with unwanted range data.

In a typical ground image, objects close to the camera are usually mapped toward the bottom of the image and objects located far away from the camera are normally found around the top edge of the image. Following one convention for disparity representation in which the further an object is from the camera the darker it is represented in the disparity image, dark intensities would generally expected in the top half of the disparity image and light intensities would be expected in the bottom half of the disparity image. One way to find and eliminate small and isolated groups of pixels with the wrong disparity is to do an image inversion (as discussed above). Noisy matches are typically enhanced and appear as very dark dots in the inverted image. Thus, an image inversion can be used to detect and eliminate noise in the image ranges that include information of interest.

While the separation by range intervals technique can be used to eliminate noise based on knowing something about the horizontal characteristics of the field scene captured in the stereo images, it is also possible to eliminate noise based on some knowledge of the vertical characteristics of the field scene. After coordinate transformation has been completed on the disparity image, a scene represented by a system of coordinates is expected in which vertical objects (such as plants or trees) and a horizontal ground are clearly identified. Knowing the expected height of the vertical objects can be valuable information which can be used to eliminate useless data and noise above the vertical area of interest. For example, if the field scene comprises a row of apple trees, eliminating data above the expected height of the trees can eliminate noise created by things above the vertical height of the trees, such as clouds. Similarly, image data corresponding to vertical heights below the expected horizontal ground can also be eliminated.

Adjusting the height to be in the plane of Z=0 and adjusting tilt angle of the camera so that the ground plane is approximately parallel to the Z=0 plane can increase the effectiveness of noise reduction techniques and can help in ensuring quality data in a local map. With respect to the camera height, if there is an offset between the origin of heights (Z=0) and the local map 3D cloud base ground, $h_c$ can be adjusted to improve the stereo representation.

Figure 18:
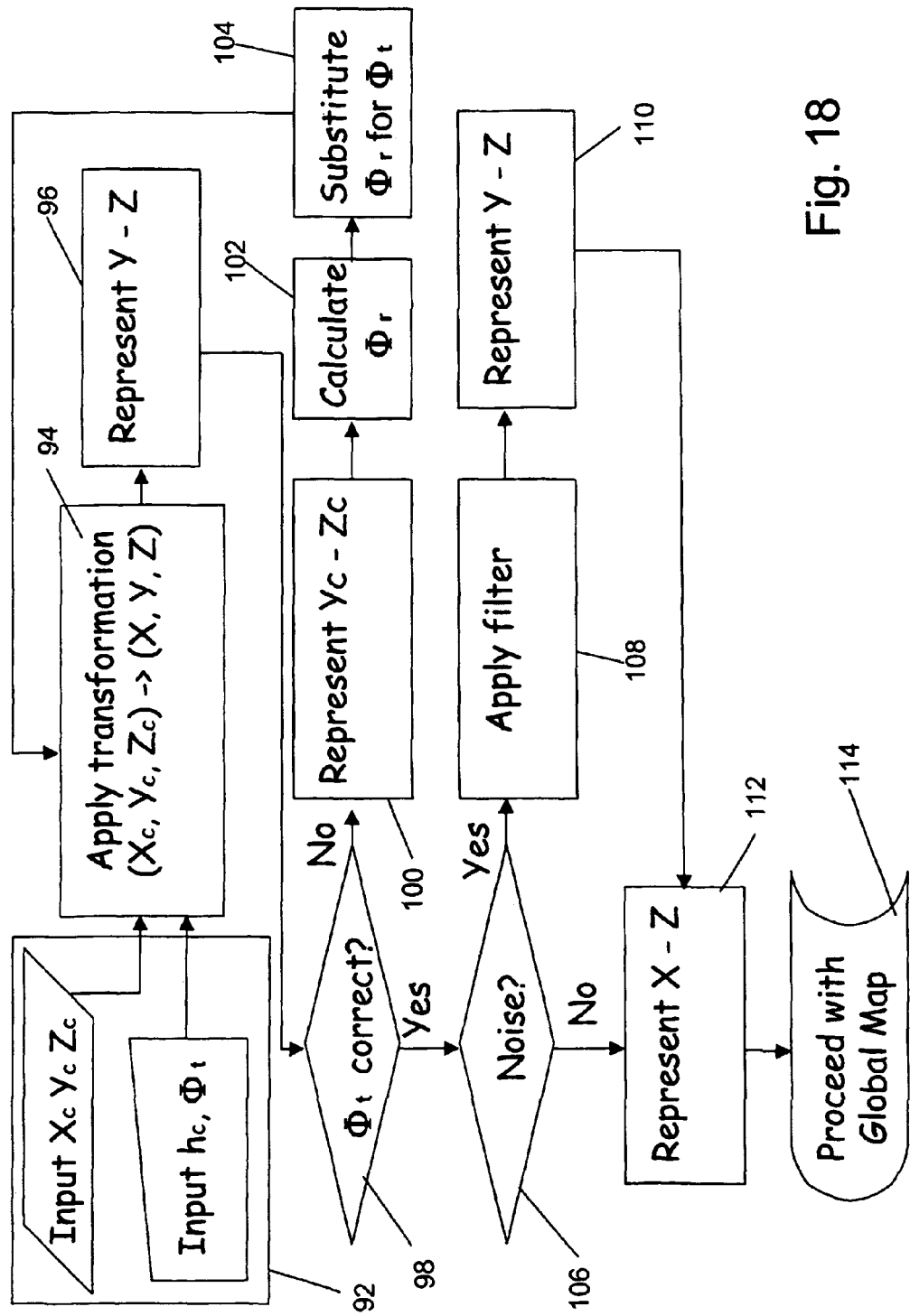
FIG. 18 is a diagrammatical representation of one embodiment of a method for preparing local map data according to the present invention.

FIG. 18 illustrates one method for preparing local map data by using noise reduction and making parameter corrections. As can be seen in FIG. 18, the camera coordinates ($X_c$, $Y_c$, $Z_c$), camera height ($h_c$), and theoretical camera tilt angle ($\phi_t$) are provided as inputs (step 92). The camera coordinates ($X_c$, $Y_c$, $Z_c$) are provided by the stereo algorithm and the camera height ($h_c$) and theoretical camera tilt angle ($\phi_t$) can be measured from the actual system used to acquire the images. A transformation from camera coordinates to ground coordinates is made (step 94) and a side view representation of the ground coordinates is produced by producing a Y-Z plot of the ground coordinates (step 96). An examination of the Y-Z plot can be made in step 98 to determine if the theoretical tilt angle of the camera ($\phi_t$) produces a map with a plane parallel to the Z=0 plane (step 98). If it does not, a side view representation of the camera coordinates is produced by producing a $Y_c$-$Z_c$ plot of the camera coordinates (step 100) and a real angle ($\phi_r$) for producing a map with a plane parallel to the Z=0 plane can be determined from the $Y_c$-$Z_c$ plot (step 102). The real angle ($\phi_r$) can be substituted for the theoretical camera tilt angle ($\phi_t$) (step 104) and the routine returns to the camera to ground coordinates transformation (step 94) to perform a new transformation with the corrected, real angle ($\phi_r$).

If the theoretical camera tilt angle ($\phi_t$) is correct (or has been corrected by being substituted with a real angle ($\phi_r$)), the coordinate array is checked for noise (step 106). If noise is detected, various noise filters can be applied (step 108). For example, one sample filtering routine could include defining maximum and minimum X, Y and Z coordinate values as discussed more fully above. In this case a filter could be applied to each set of coordinates (X, Y, Z) as follows:

If $X_{min} < X < X_{max}$ and
$Y_{min} < Y < Y_{min}$ and
$Z_{min} < Z < Z_{min}$
Then add (X, Y, Z) to global map data set.

After filtering, a new side view representation can be produced by producing a new Y-Z plot with the filtered data (step 110) and a front view representation can be produced by producing a X-Z plot with the filtered data (step 112). If noise is not detected, the previously produced side view representation can be used and a front view representation can be produced by producing a X-Z plot (step 112). After producing side and front view representations, the algorithm can proceed to the global map assembly part of the routine.

With the data developed at this point, the system is capable of rendering a three-dimensional image of the agricultural field scene in a so-called "local map." Commercial rendering software can be used to convert the local map array of coordinates into a 3-D map. The superpositioning of may local maps onto a common coordinate system can be used to generate a global map of the agricultural field scene. As described herein, global location data can be recorded for each camera location used to produce a local map. This global location data can be used to convert each local map's center of coordinate to be the same global map center. However, the rest of the data points forming the 3-D cloud of each local map will still make reference to their corresponding local map center. As such, a conversion must be made for every single data point in each local map so that every point is expressed in global coordinates. Once this is done, a global map can be creates since every coordinate data point will refer to the same center.

Figure 19:
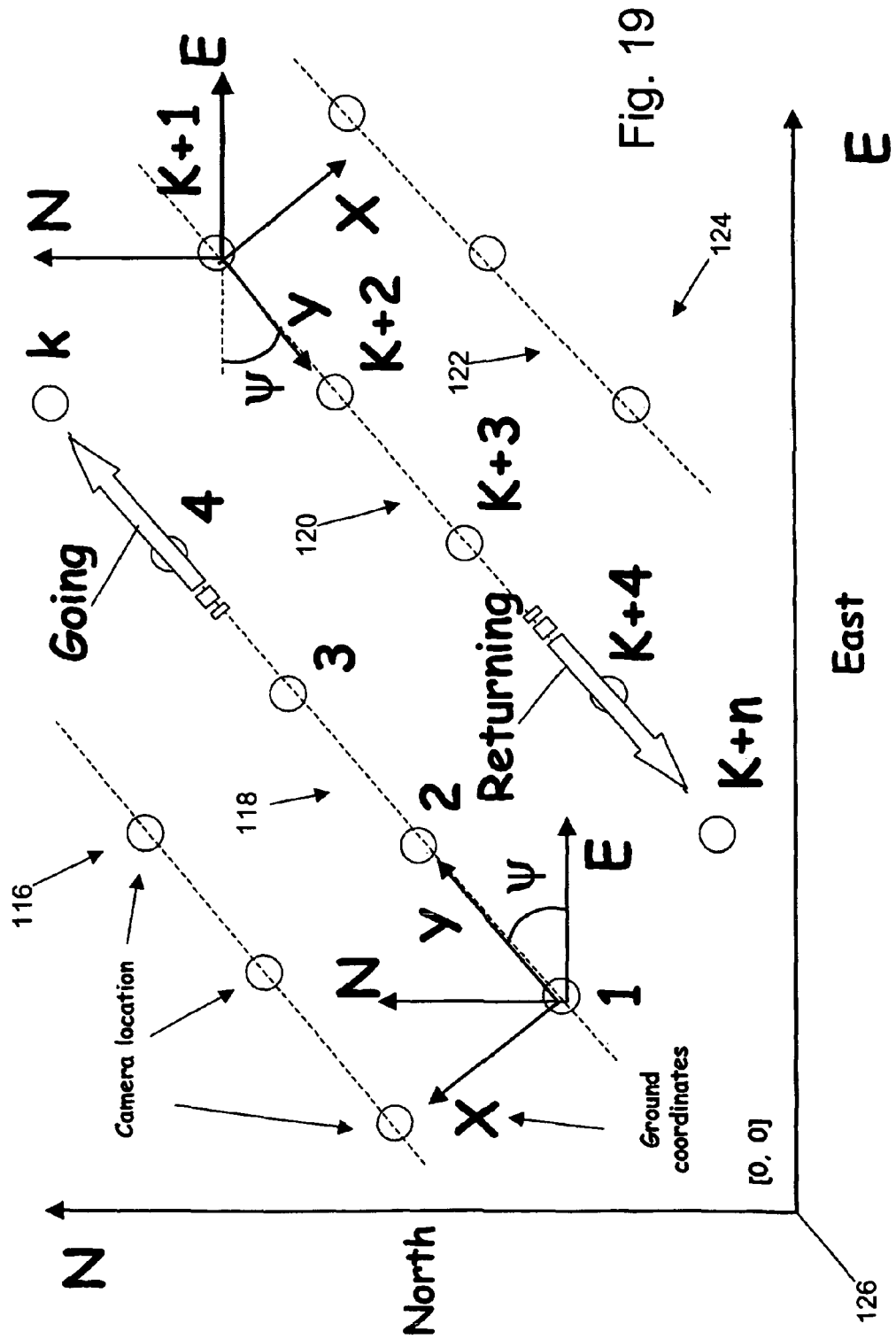
FIG. 19 is a diagrammatical representation of one embodiment illustrating converting data points from various local maps into global coordinates having a common coordinate center according to the present invention.

FIG. 19 illustrates one example process for converting data points from various local maps into global coordinates having the same coordinate center for use in rendering a global map of an agricultural field scene. The origin of FIG. 19 is arbitrarily set at the point [0, 0]. Global coordinates are denoted by E and N whereas the ground coordinates of the local maps are denoted by X and Y. Every camera location implies a local map whose ground coordinates must be transformed to global coordinates. The angle between the rows of camera paths through the field scene and the East direction is measured by Ψ. This angle, called orientation angle, typically only needs to be determined once per field since a mapping vehicle generally travels along parallel paths when mapping a field scene. It should be noted, however, that the transformation equations discussed herein are different when the vehicle going away from the global map origin than if the vehicle is traveling towards the origin.

FIG. 19 illustrates four sets of local maps data arranged in rows 116, 118, 120, 122 corresponding to parallel paths traveled by a vehicle mapping an agricultural field scene 124. In a typical situation, adjacent rows will be mapped in opposite directions. In other words, if row 116 was mapped by a vehicle traveling toward the designated global map origin 126, than row 118 would be mapped by a vehicle traveling away from the origin 126, row 120 would be mapped by a vehicle traveling toward the origin 126, and 122 would be mapped by a vehicle traveling away, etc. For the purposes of this example, rows 118 and 120 are focused upon. As can be seen, row 118 comprises camera locations 1, 2, 3, 4, ... K and row 120 comprises camera locations K+1, K+2, K+3, K+4, ... K+n. Other variables and parameters include:

$i_R$=1, 2, ... $k_R$ Number of images in one particular row R
$P_j$ Number of data points in image j
R Row chosen to calculate the orientation angle
N Number of images employed in the global map
NP Total number of points in the global map Where NP will be found by adding the data points gathered in every single image:

$$NP = \sum_{n=1}^{N} P_n = P_1 + P_2 + \ldots + P_N$$

The orientation angle discussed above can be approximately calculated as:

$$\Psi = \arctan \frac{N_k - N_1}{E_k - E_1}$$

where:
$N_k$ North coordinate of the origin of the last image (k) of row R
$N_1$ North coordinate of the origin of the first image of row R
$E_k$ East coordinate of the origin of the last image (k) of row R
$E_1$ East coordinate of the origin of the first image of row R If "u" is considered to be any point of know ground coordinates, than u∈[1, NP]. But U is at the same time a point of a local map, for example, in image j. If so, point u can be converted to global coordinates using as follows:

$N(u) = N_j + [Y(u) \cdot \sin \Psi + X(u) \cdot \cos \Psi] \cdot \text{sign}$ $E(u) = E_j + [Y(u) \cdot \cos \Psi - X(u) \cdot \sin \Psi] \cdot \text{sign}$ Where:
[N(u), E(u)] Global coordinates of point u
[$N_j$, $E_j$] Global coordinates of origin of image j to which point u belongs
Ψ Orientation angle
sign 1 if the vehicle is traveling away from origin, −1 if the vehicle is traveling toward the origin As mentioned herein, since the local map system of reference is fixed to the vehicle, the relative orientation of the local map axes with the global map axes (fixed with respect to the vehicle) will be different according to the direction of travel of the vehicle. The "sign" parameter is introduced to accommodate this in the sample transformation equation described above. It should also be noted that if the vehicle is not traveling in parallel rows, the orientation angle will have to be recalculated for each row.

Figure 20:
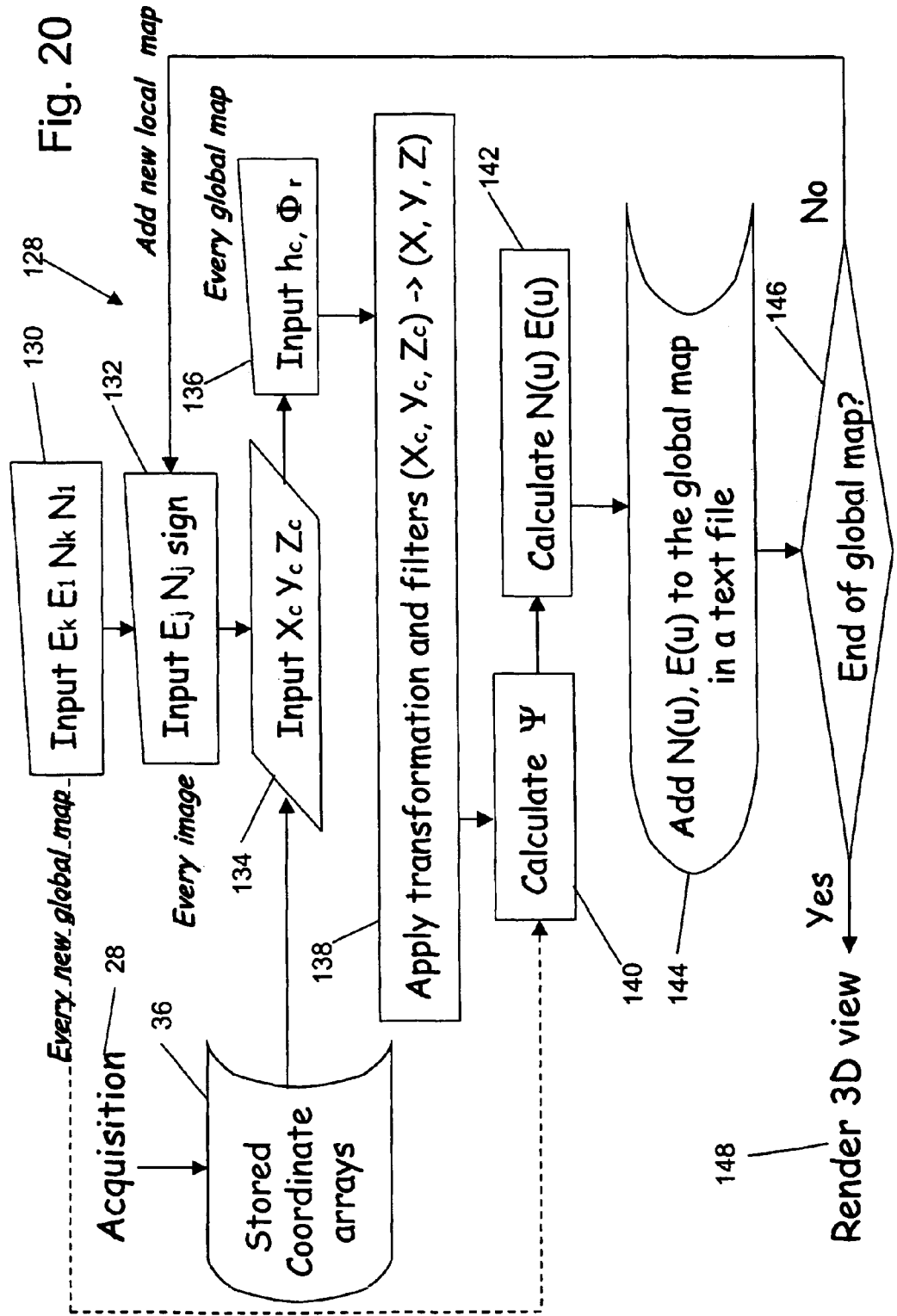
FIG. 20 is a diagrammatical representation of one embodiment of a process for generating a global map from multiple local maps according to the present invention.

As in the process of creating a local map, a computer program can be created for executing an algorithm for generating a global map. FIG. 20 illustrates one sample algorithm 128 for generating a global map. Certain information must be provided as input to the algorithm 128 in order to generate a global map. Some of the inputted information will be the same for every local map used in generating a global map so this information only need to be inputted one time. Other information is unique to a particular local map and thus, this information can be inputted separately for each local map. For example, the first step in the sample algorithm 128 shown in FIG. 20 involves inputting the $E_k$, $E_l$, $N_k$, and $N_l$ origin coordinates (step 130). These inputs can be used to calculate the orientation angle Ψ and thus, if the vehicle travels in parallel rows, this information only needs to be inputted one for each new global map generated by the algorithm 128. The next step is to input the $E_j$, $N_j$, and sign parameters (step 132). Since these parameters are tied to a specific local map, this information can be inputted each time a now local map is added to the global map.

Next, the stored coordinate array for a local map, along with the camera coordinates for that local map, can be inputted into the algorithm (step 134). In the sample algorithm illustrated in FIG. 20, the local map portion of the algorithm acquires the local map images (step 28) and stores the coordinate arrays (step 36) in a location which can be read by the global map algorithm 128. Obviously, the local map coordinate arrays and camera coordinates are unique to each local map and can be inputted into the global map algorithm 128 for each local map added to the global map. The camera height ($h_c$) and camera tilt angle ($\phi_r$) are also inputted (step 136) and, assuming all of the local maps were generated using the same setup, only need to be input once per global map.

With this information, the algorithm 128 can perform the appropriate coordinate transformations and apply the necessary filters and correction to the tilt angle of the camera ($\phi_r$) (step 138). Once the data points are expressed in ground coordinates, the orientation angle Ψ can be computed (step 140) and the global coordinates (N(u), E(u)) of each data point can be calculated (step 142). Finally, the global coordinates of the present local map (centered at $N_j$, $E_j$) can be added to the global map file (step 144). The algorithm 128 then checks to see if all of the local maps have been added (step 146). If not, it returns to step 132 and begins the process again. If all of the local maps have been added, the algorithm moves onto the step of rendering a three-dimensional image of the global map (step 148).

It should be noted that one advantage of a global map according to the present invention is that every point, no matter how it was acquired, can be referred to the same origin and system of coordinates. Thus, it is possible to merge local maps acquired from aircraft with local maps acquired from ground vehicles to provide information that can yield a more complete 3D map of an agricultural field scene. In order to do so, some of the inputs to algorithm 128 will have to be reinputted when switching from local maps acquired from another vehicle.

There are many different applications for the inventions disclosed and claimed herein. One possible application is farming involving extensive crops, such as corn, soybeans, wheat or alfalfa, a 3-D agricultural field scene map according to the present invention, can provide much useful information. For example, crop row distribution and organization can be of interest to a farmer. Information pertaining to the distance between rows and the row width provide valuable information for automatic vehicle guidance. Crop height information can be an indicator of crop growth and regular updates can give information about the rate of growth as well as growth uniformity in the field. As described in more detail above, volume estimation can be employed to estimate crop yield.

Another possible application is for providing information about orchards where trees are arranged in rows. In this application, tree spacing, such as the distance between row and/or the distance between trees within a row, can be useful for automatic vehicle guidance. Tree height can be measured and used as an indicator of growth from year to year. Tree volume estimations can be done to determine to estimate canopy. Canopy information can be used for smart spraying where the applied spray dose is proportional to the canopy volume. Tree volume can be easily rendered as it is proportional to the number of points in the 3-D image above a certain height.

Another possible application is to sense farm infrastructure components utilized to manage orchards and other obstacles. For example, the location and height of posts and their location with respect to various crops can sensed.

One of the major concerns in the design of autonomous vehicles is the detection of obstacles obstructing a vehicle's trajectory. One other possible application of the present invention is as a detection system configured to halt a vehicle if there is an object in its path, such as a storing box, an animal, or even a person. As a vehicle approaches an object, its identification through the disparity image becomes clearer, however the object has already been detected even when the camera is further away.

Figure 21B:
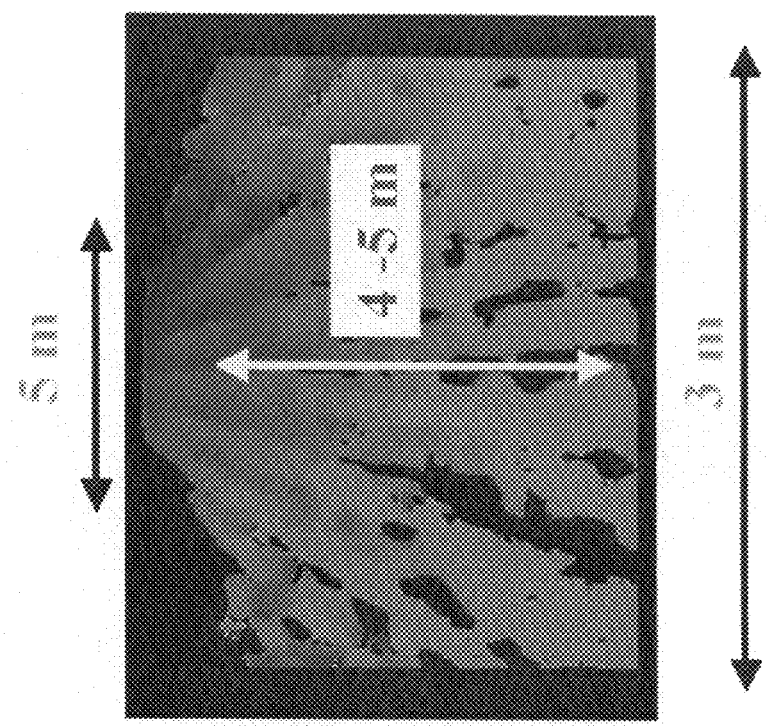
Figure 21A:
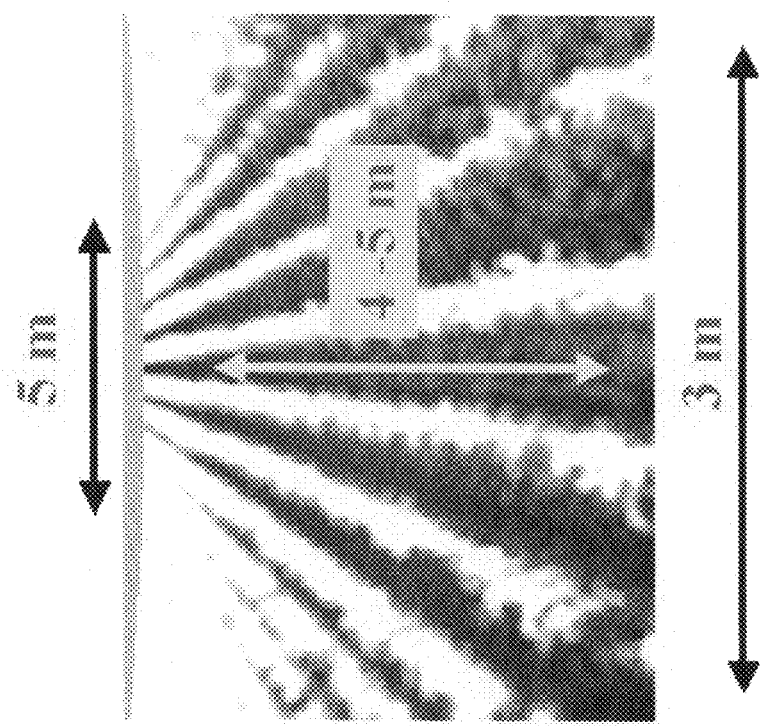
FIG. 21a is one embodiment of a sample left image of a stereo pair taken from a ground vehicle according to the present invention.
Figure 21C:
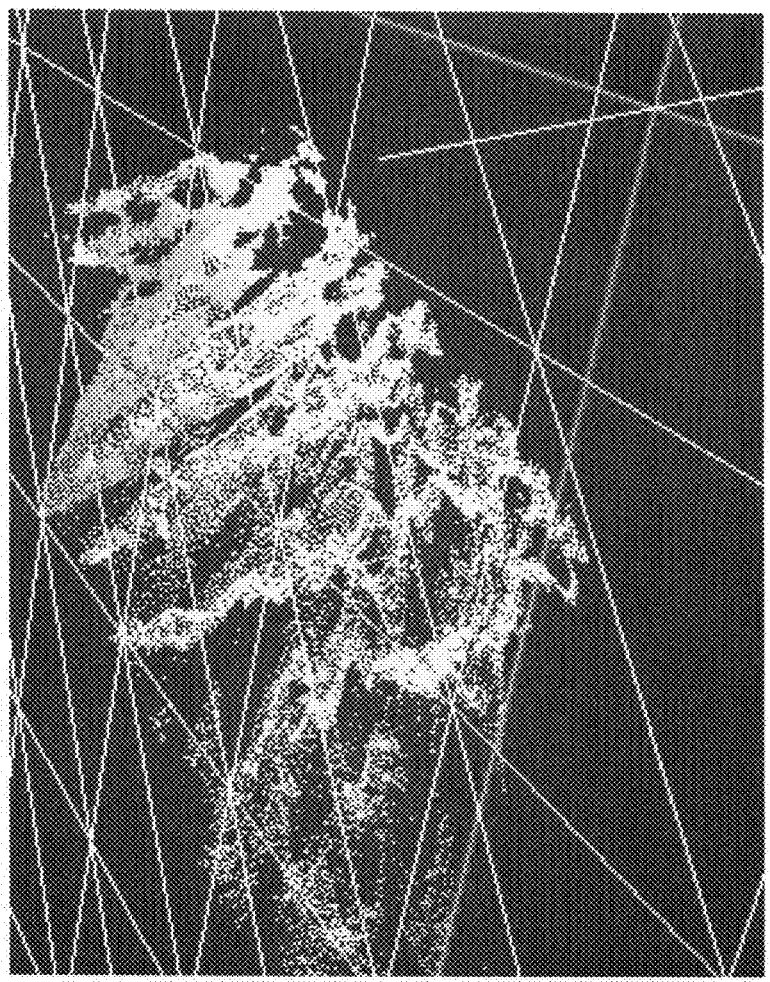
FIG. 21C is one embodiment of a sample three-dimensional local map representation of the corresponding to FIGS. 21a and b
Figure 24:
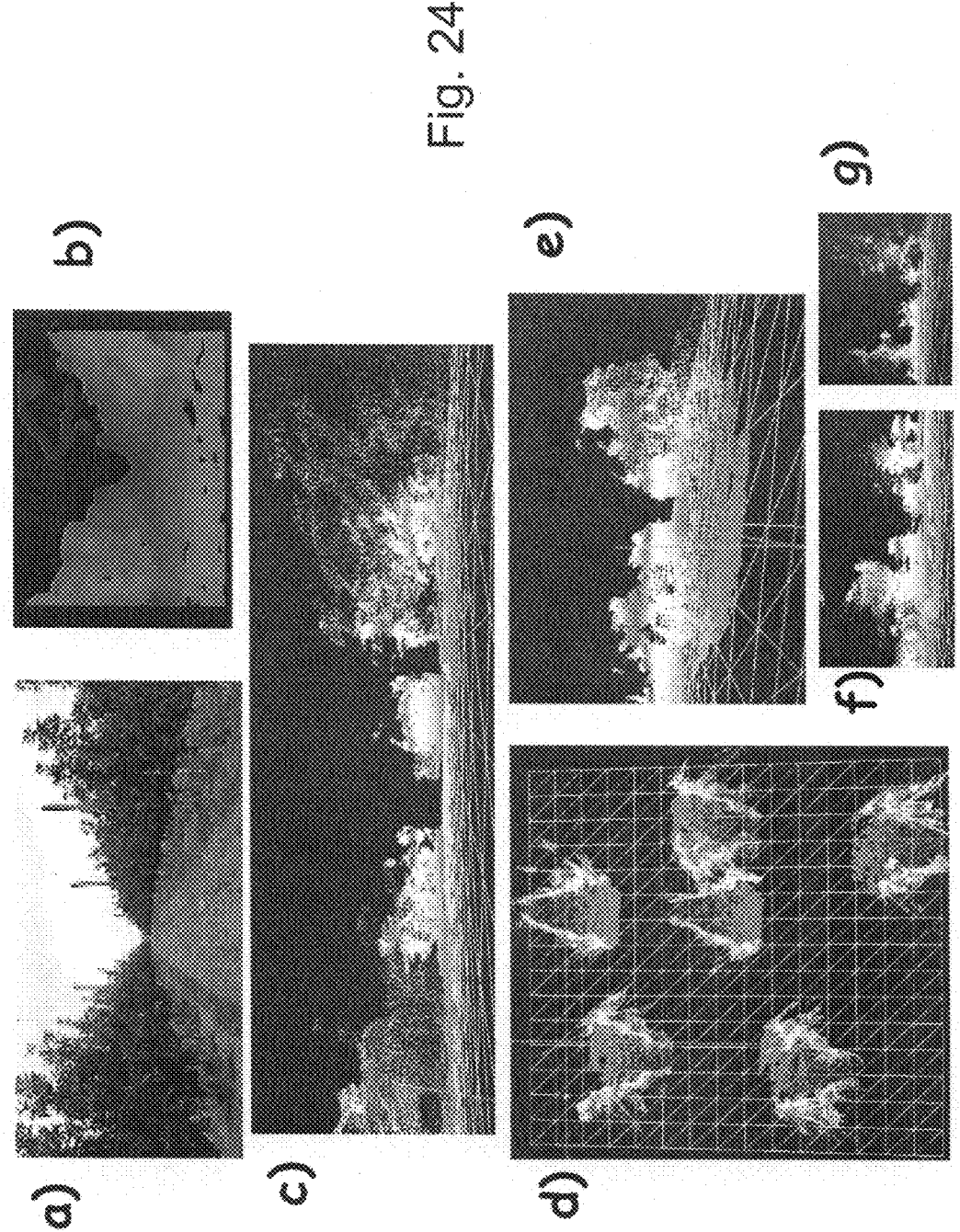
FIGS. 24a-24g illustrate one embodiment of various views of images of an exemplary agricultural field scene including an orchard of apple trees according to the present invention.
Figure 25:
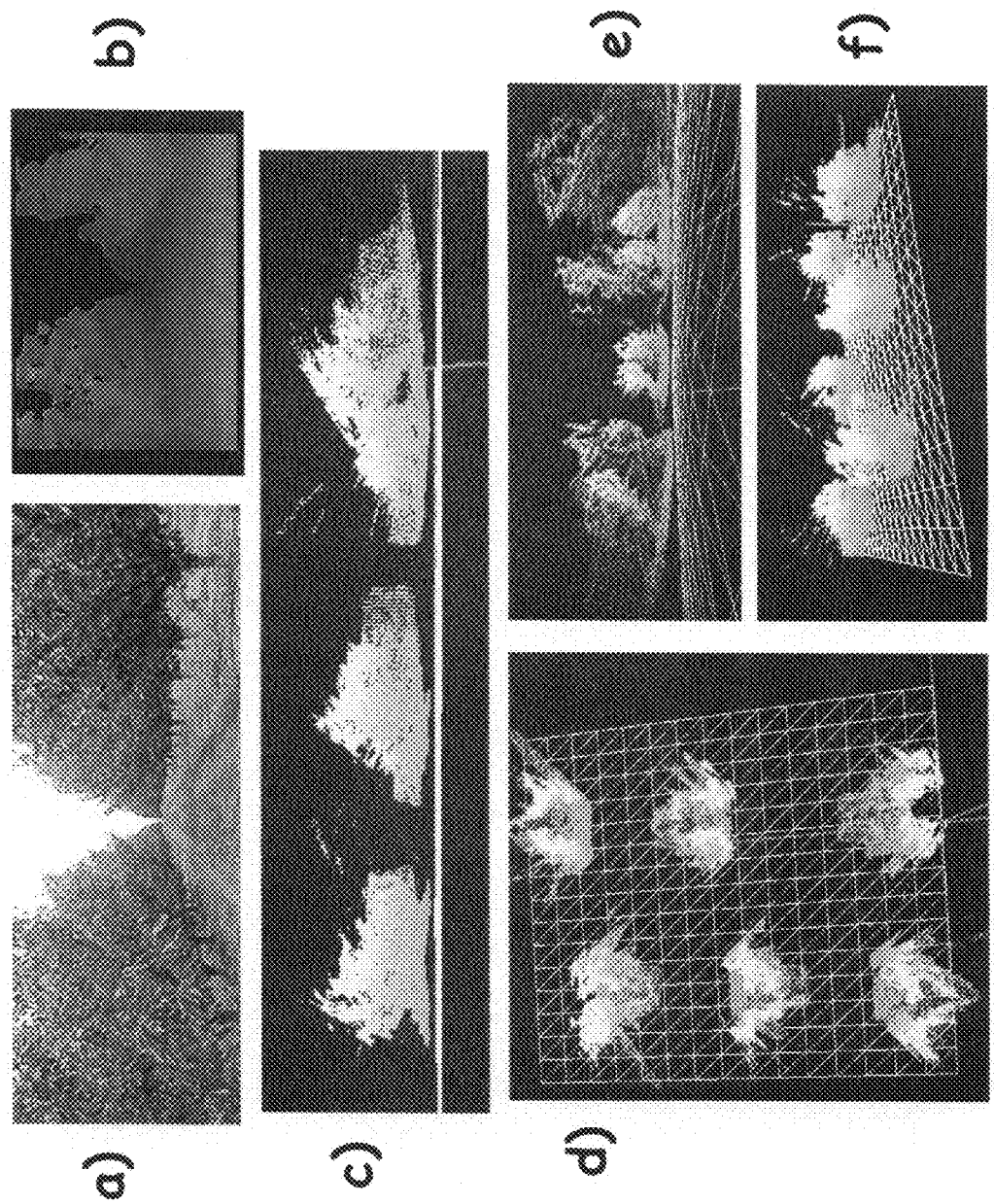
FIGS. 25a-25f illustrate another embodiment of various views of images of an exemplary agricultural field scene including an orchard of cherry trees according to the present invention.
Figure 26:
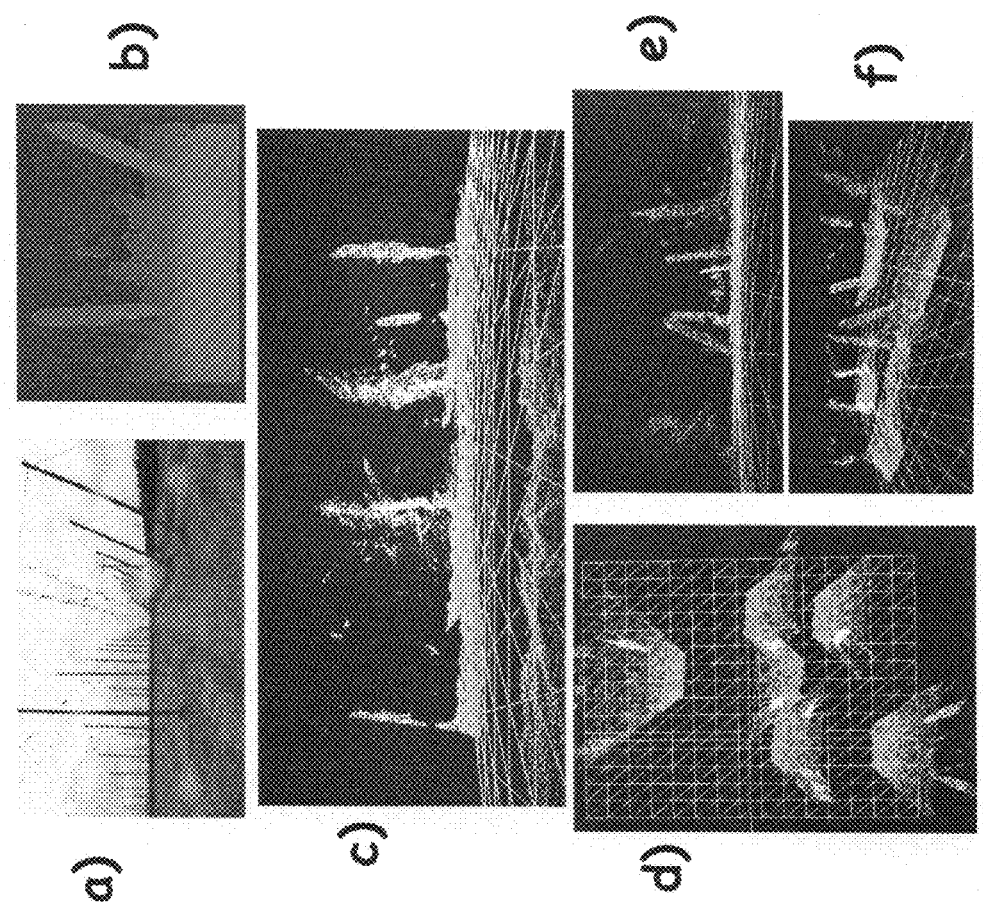
FIGS. 26a-26f illustrate another embodiment of various views of images of an exemplary agricultural field scene including a barren field having vertical posts according to the present invention.
Figure 27:
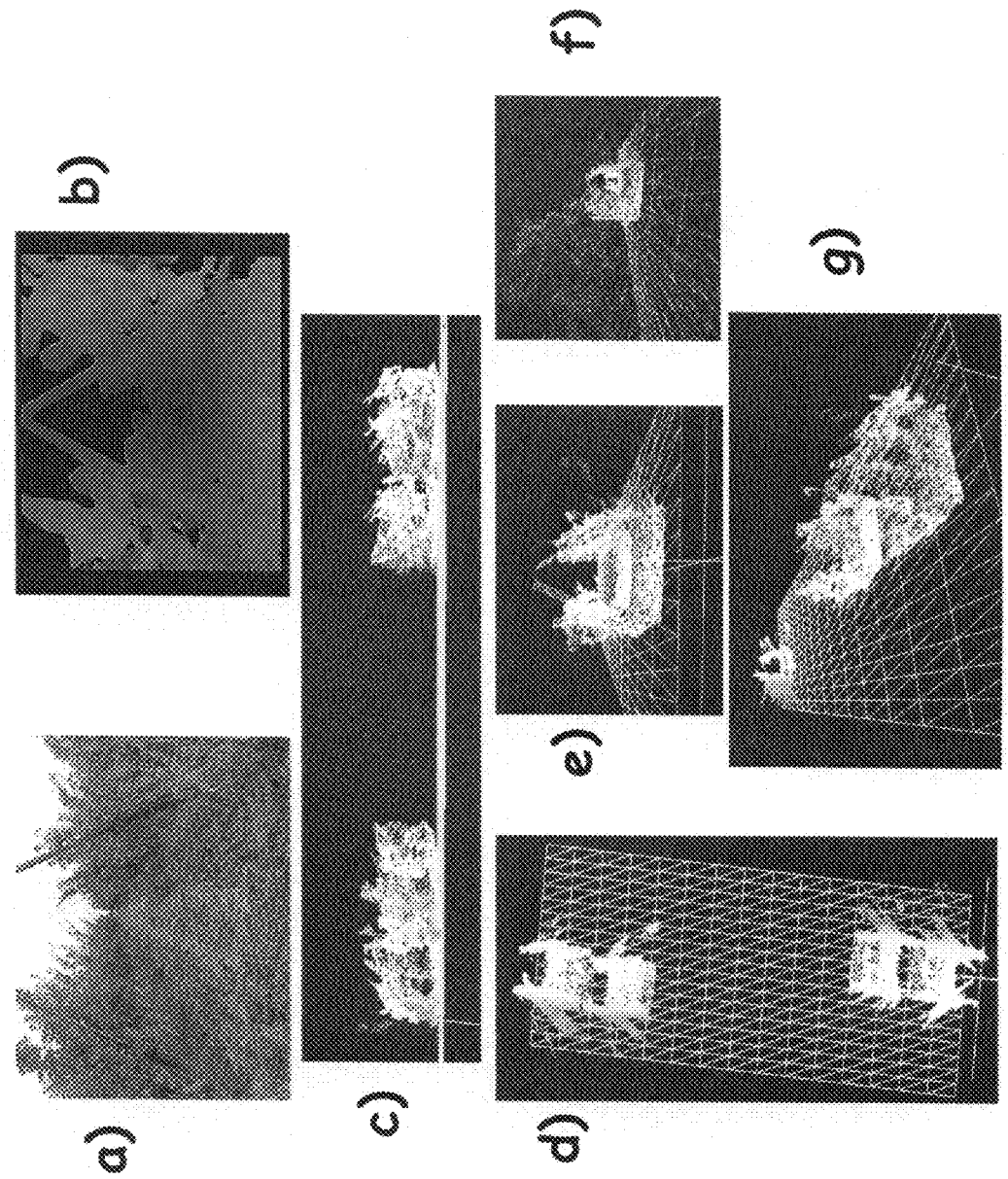
FIGS. 27a-27g illustrate another embodiment of various views of images of an exemplary agricultural field scene including an apple orchard with trees in a V-shape structure according to the present invention.
Figure 28:
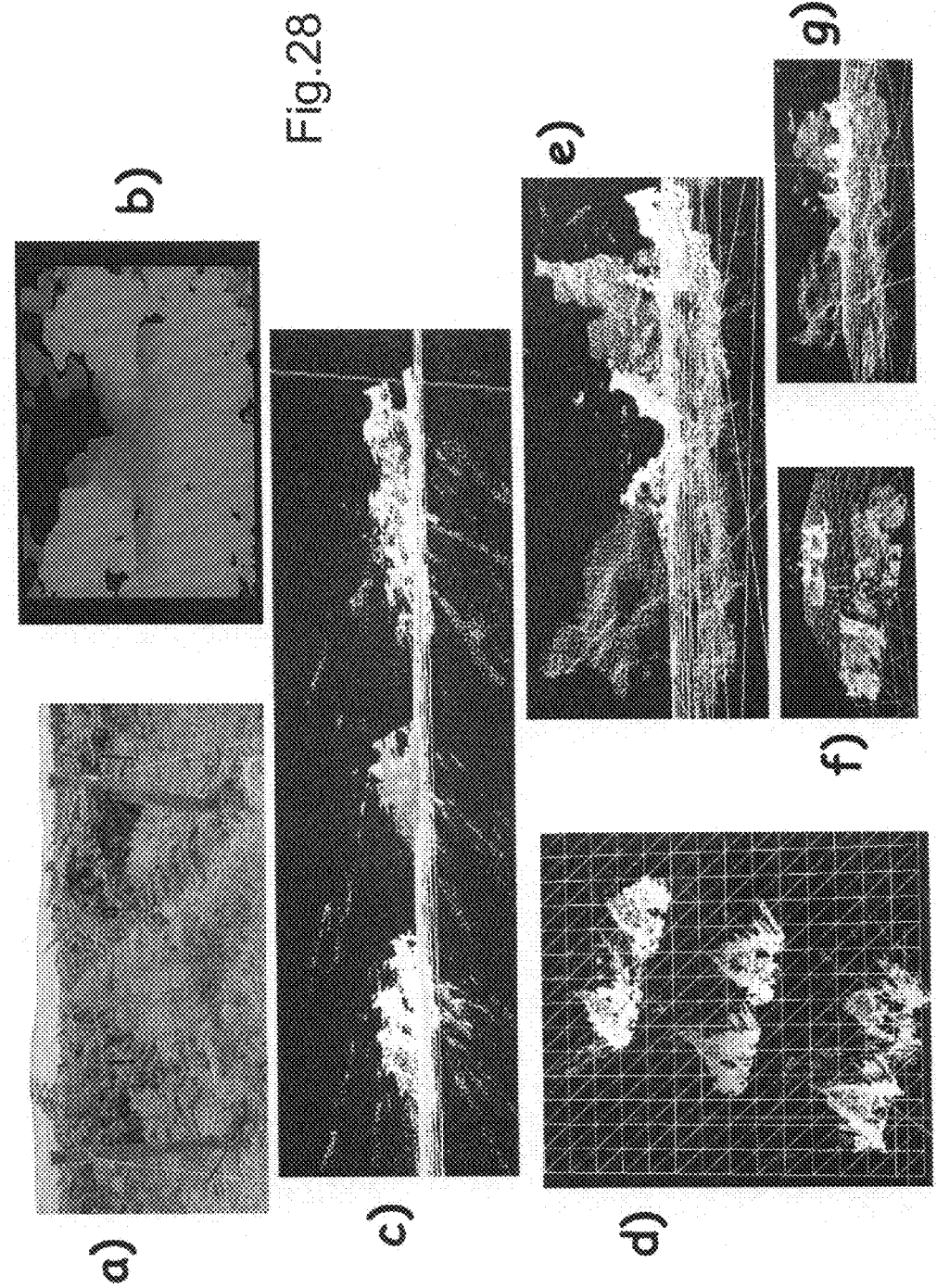
FIGS. 28a-28g illustrate another embodiment of various views of images of an exemplary agricultural field scene including a vineyard according to the present invention.
Figure 29:
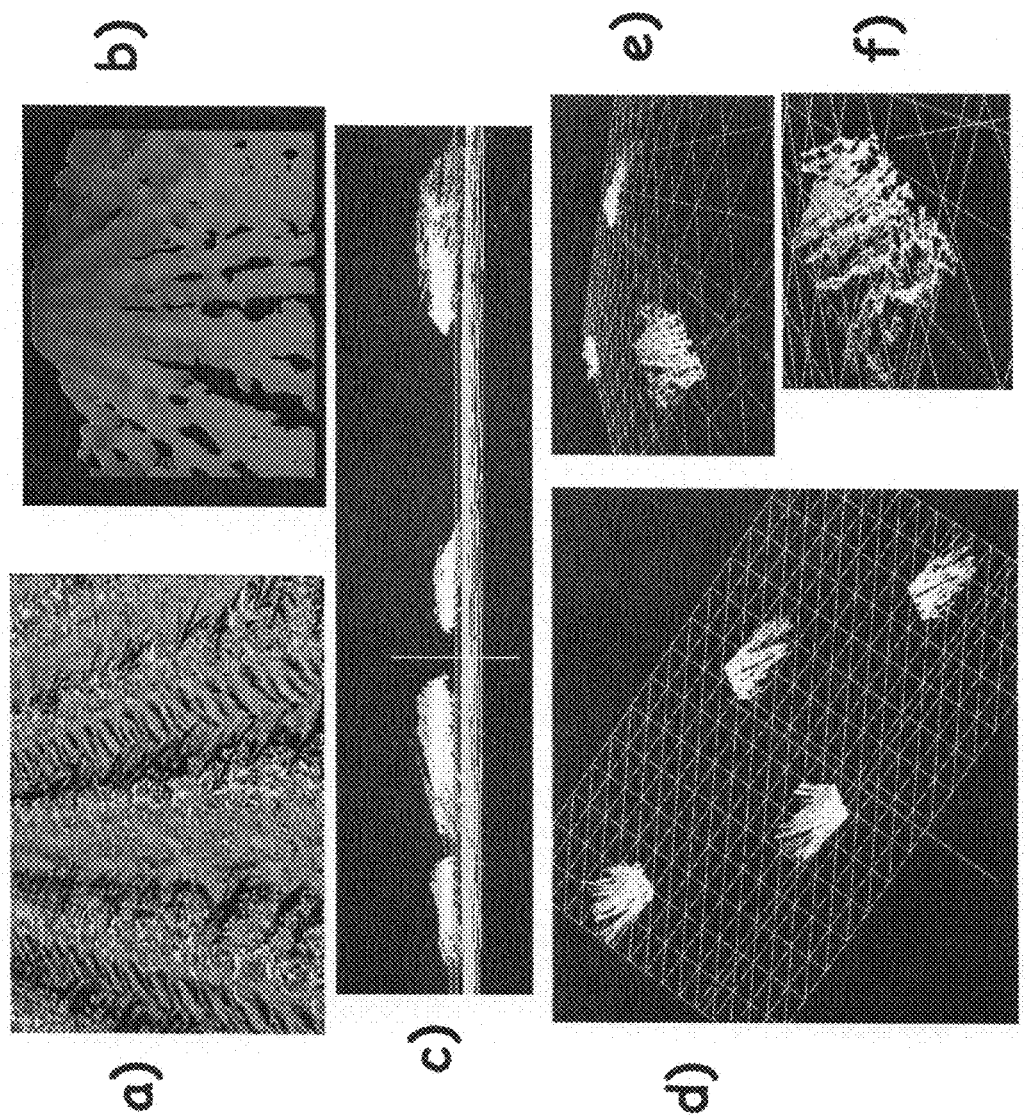
FIGS. 29a-29f illustrate another embodiment of various views of images of an exemplary agricultural field scene including rows of corn according to the present invention.

FIG. 21b illustrates one example of a disparity image made from images taken from a ground vehicle according to the present invention. This image represents the three dimensional coordinates of crop rows in a field. In generating this disparity image, common features found in the right and left stereo images are matched (the left image is shown as FIG. 21a) and depth information is calculated based on the common features. As can be seen, the X and Y dimensions are shown in the image itself and the Z dimension is represented by varying the image intensity. For example, in the disparity image shown in FIG. 21b, the closer an article is to the camera, the brighter it appears in the disparity image. Black portions of the disparity image indicate areas where no disparity data is available. FIG. 21c illustrates a 3-dimensional local map representation of the crop rows and field scene of FIGS. 21a and 21b.

FIG. 22a illustrates a sample left image of a stereo pair taken from an aircraft according to the present invention. The corresponding disparity image is shown in FIG. 22b. A conventional image of the same field, captured with the same platform is shown in FIG. 22c.

FIGS. 23a and 23b provide an illustrative description of images shown in FIGS. 24-29. As shown in FIG. 23a, FIGS. 24-29 are arranged in image panes with a real image of an agricultural field scene shown in the upper left hand corner 150, a corresponding disparity image shown in the upper right hand corner 152, a 3-D global map side view across the center 154, a 3-D global map top view in the lower left hand corner 156, and 3-D global map front and general views in the lower right hand corner 158. FIG. 23b provides an illustrative explanation of the various 3-D global map views.

FIGS. 24a-24g illustrate the various views of an exemplary agricultural field scene including an orchard of apple trees. FIGS. 25a-25f illustrate the various views of an exemplary agricultural field scene including an orchard of cherry trees. FIGS. 26a-26f illustrate the various views of an exemplary agricultural field scene including a barren field having vertical posts. FIGS. 27a-27g illustrate the various views of an exemplary agricultural field scene including an apple orchard with trees in a V-shape structure. FIGS. 28a-28g illustrate the various views of an exemplary agricultural field scene including a vineyard. FIGS. 29a-29f illustrate the various views of an exemplary agricultural field scene including rows of corn.

Turning now to the crop row detection methodology, a system and method according the present invention can use image segmentation of a disparity image of the type described in detail above in order to separate crop rows represented in the disparity image from the background. As is discussed above, any point from the sensed scene with disparity information can be immediately linked to a 3-dimensional position whose (X, Y, Z) coordinates are known. One embodiment of the present invention uses a pattern recognition technique, such as regression analysis, to detect crop rows in the disparity image.

In one embodiment, biasing is done to a disparity image such that crop rows end up as points with disparity but the background is already filtered out by the matching process inherent to stereo analysis. With this biasing, there is no need for conventional pre-processing routines, such as binarization processes or threshold calculations, since the image is already prepared to perform pattern recognition tasks. This can significantly reduce the processing time of each cycle.

Some sample methods of biasing can include setting the lenses of the stereo camera to allow either under or over expose the images acquired by the stereo camera.

It can be appreciated that numerous other possible applications of the present invention are possible and the applications mentioned herein are merely for sample purposes and not meant in any way to limit the spirit and scope of the invention as claimed in the appended claims.

While the particular systems and methods herein shown and described in detail are fully capable of attaining the above-described objects of the invention, it is understood that the description and drawings presented herein represent some, but not all, embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. An apparatus for creating a 3-dimensional field scene map, comprising:
 at least one camera for producing a pair of images of the field scene; and
 means for creating a disparity image from the pair of images; wherein
 the disparity image comprises a 3-dimensional image encoded with x, y, and z coordinates relative to the at least one camera; and the creating of the 3-dimensional map comprises determining at least one of a camera to ground distance and a camera tilt angle.

2. The apparatus of claim 1, wherein the at least one camera comprises a stereo camera.

3. The apparatus of claim 1, wherein each of the pair of images comprises digital images.

4. The apparatus of claim 3, wherein the pair of digital images overlap and include common features, and wherein the means for creating a disparity image is configured to match the common features from the pair of digital images.

5. The apparatus of claim 4, wherein the means for creating a disparity image comprises a computer running a software program.

6. The apparatus of claim 1, further comprising means for transforming the disparity image into a 3-dimensional local map of the field scene.

7. The apparatus of claim 6, wherein multiple 3-dimensional local maps of the field scene are produced from generated disparity images, and further comprising means for fusing the multiple 3-dimensional local maps into a 3-dimensional global image.

8. The apparatus of claim 6, wherein the means for transforming the disparity image is configured to use image parameters to transform the disparity image.

9. The apparatus of claim 8, wherein the image parameters include camera focal length and camera center.

10. The apparatus of claim 1, further comprising a location tracking device configured for providing geographic location information.

11. The apparatus of claim 10, wherein the location tracking device comprises a global positioning system.

12. The apparatus of claim 1 further comprising a filter for filtering errors from the disparity image.

13. The apparatus of claim 1, wherein the field scene is an agricultural field scene.

14. The apparatus of claim 1, wherein the at least one camera comprises two distinct cameras.

15. A method for making a 3-dimensional map of a field scene, the method comprising the steps of:
    acquiring at least one set of images of the field scene using one or more cameras;
    creating a disparity image based on the at least one set of images, the disparity image including depth information for objects captured in the at least one set of images; and
    creating a coordinate array of 3-dimensional coordinates for the objects captured in the at least one set of images, wherein the creating comprises determining at least one of a camera to ground distance and a camera tilt angle.

16. The method of claim 15, wherein the at least one set of images comprise stereo images.

17. The method of claim 15, wherein the 3-dimensional coordinates are 3-dimensional camera coordinates; and wherein the method further comprises the step of converting the 3-dimensional camera coordinates into 3-dimensional ground coordinates.

18. The method of claim 15, further comprising the step of filtering the 3-dimensional coordinates to remove noise.

19. The method of claim 18, wherein the step of filtering the 3-dimensional coordinates comprises ignoring 3-dimensional coordinates above a predetermined threshold.

20. The method of claim 18 wherein the step of filtering the 3-dimensional coordinates comprises ignoring 3-dimensional coordinates below a predetermined threshold.

21. The method of claim 18, wherein the at least one set of images is acquired by a stereo camera, and wherein the step of filtering the 3-dimensional coordinates comprises ignoring 3-dimensional coordinates a predetermined distance away from stereo camera.

22. The method of claim 15, further comprising the step of rendering the coordinate array as a 3-dimensional map.

23. The method of claim 15 further comprising the step of filtering the 3-dimensional ground coordinates by ignoring ground coordinates having a Z value above a predetermined threshold.

24. The method of claim 15, wherein the at least one set of images comprise stereo images, the at least one set of stereo images being acquired by a stereo camera, and wherein a corrected camera tilt angle is applied such that the method produces a resulting 3-dimensional map of a field scene having a plane parallel to a Z=0 plane.

25. A method for making a 3-dimensional map of a field scene, comprising the steps of:
    acquiring a plurality of sets of images of the field scene using one or more cameras;
    creating a disparity image based on each set of images, each disparity image including depth information for objects captured in the corresponding set of images;
    creating a coordinate array of 3-dimensional coordinates for the objects captured in each set of stereo images, wherein the creating comprises determining at least one of a camera to ground distance and a camera tilt angle;
    acquiring a geographic location origin for each set of stereo images;
    performing a coordinate transformation on the 3-dimensional coordinates for the objects captured in each set of images so that the coordinates relate to a common origin; and
    merging the transformed 3-dimensional coordinates into a global map comprising a 3-dimensional representation of the field scene.

26. The method of claim 25, further comprising the step of rendering the transformed 3-dimensional coordinates of the global map into a 3-dimensional map of the field scene.

27. The method of claim 26, wherein the field scene is an agricultural field scene.

28. The method of claim 27, wherein each of the plurality of sets of images are stereo images generated from a stereo camera.

* * * * *

UNITED STATES PATENT AND TRADEMARK OFFICE
CERTIFICATE OF CORRECTION

PATENT NO. : 8,712,144 B2  
APPLICATION NO. : 10/817900  
DATED : April 29, 2014  
INVENTOR(S) : Francisco Rovira Mas, Qin Zhang and John Franklin Reid Page 1 of 1

It is certified that error appears in the above-identified patent and that said Letters Patent is hereby corrected as shown below:

Title Page
Item (73) Assignees:

Change "Deere & Company, Moline, IL (US); University of Illinois Grant and Contrect Administration, Champaign, IL (US)" to -- Deere & Company, Moline, IL (US); University of Illinois Grant and Contract Administration, Champaign, IL (US) --

Signed and Sealed this
Sixteenth Day of September, 2014

Michelle K. Lee
*Deputy Director of the United States Patent and Trademark Office*